(12) United States Patent
Seccamonte et al.

(10) Patent No.: US 11,827,241 B2
(45) Date of Patent: Nov. 28, 2023

(54) ADJUSTING LATERAL CLEARANCE FOR A VEHICLE USING A MULTI-DIMENSIONAL ENVELOPE

(71) Applicant: Motional AD LLC, Boston, MA (US)

(72) Inventors: Francesco Seccamonte, Singapore (SG); Eric Wolff, Cambridge, MA (US); Emilio Frazzoli, Newton, MA (US); Juraj Kabzan, Bratislava (SK)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/661,228

(22) Filed: Oct. 23, 2019

(65) Prior Publication Data
US 2020/0133280 A1      Apr. 30, 2020

Related U.S. Application Data

(60) Provisional application No. 62/810,341, filed on Feb. 25, 2019, provisional application No. 62/752,294, filed on Oct. 29, 2018.

(51) Int. Cl.
*B60W 60/00*       (2020.01)
*B60W 30/095*      (2012.01)

(52) U.S. Cl.
CPC .... *B60W 60/0013* (2020.02); *B60W 30/0956* (2013.01); *B60W 60/0016* (2020.02);
(Continued)

(58) Field of Classification Search
CPC ....... B60W 30/09–0956; B60W 60/00; B60W 60/0015–0018; B60W 2554/801;
(Continued)

(56) References Cited

U.S. PATENT DOCUMENTS

| 5,913,375 A | 6/1999 | Nishikawa |
| 8,504,233 B1 | 8/2013 | Ferguson |

(Continued)

FOREIGN PATENT DOCUMENTS

| CN | 101067557 | 11/2007 |
| CN | 105009027 | 10/2015 |

(Continued)

OTHER PUBLICATIONS

Extended European Search Report in European Appln. No. 19205825.3, dated Apr. 7, 2020, 9 pages.
(Continued)

*Primary Examiner* — Jeffrey C Boomer
*Assistant Examiner* — Paul Allen
(74) *Attorney, Agent, or Firm* — Fish & Richardson P.C.

(57) ABSTRACT

Among other things, we describe techniques for adjusting lateral clearance for a vehicle using a multi-dimensional envelope. A trajectory is generated for the vehicle. A multi-dimensional envelope is generated indicating a drivable region for the vehicle and containing the trajectory. One or more objects are identified located along or adjacent to the trajectory. At least one dimension of the generated multi-dimensional envelope is adjusted to adjust a lateral clearance between the vehicle and the identified one or more objects. A control module of the vehicle navigates the vehicle along the multi-dimensional envelope.

20 Claims, 18 Drawing Sheets

(52) U.S. Cl.
CPC ... *B60W 60/0027* (2020.02); *B60W 2540/221* (2020.02); *B60W 2554/20* (2020.02); *B60W 2554/4041* (2020.02); *B60W 2554/801* (2020.02); *B60W 2754/20* (2020.02)

(58) Field of Classification Search
CPC ......... B60W 2754/20; B60W 60/0027; B60W 2540/221; B60W 2554/20; B60W 2554/4041; G05D 1/00; G05D 1/0088; B62D 15/025–0265; G01C 21/00; G08G 1/00
USPC ..................................................... 701/23–28
See application file for complete search history.

(56) References Cited

U.S. PATENT DOCUMENTS

| | | | |
|---|---|---|---|
| 9,358,975 | B1 | 6/2016 | Watts |
| 9,873,427 | B2 | 1/2018 | Danzl et al. |
| 10,730,531 | B1* | 8/2020 | Phillips ................. G06N 20/00 |
| 11,004,000 | B1* | 5/2021 | Gutmann ............. G06N 20/00 |
| 2006/0293856 | A1* | 12/2006 | Foessel ................. G01S 13/931 |
| | | | 701/301 |
| 2008/0186205 | A1 | 8/2008 | Breed |
| 2009/0157247 | A1 | 6/2009 | Sjogren et al. |
| 2009/0204304 | A1 | 8/2009 | Urban et al. |
| 2010/0054538 | A1 | 3/2010 | Boon |
| 2012/0150437 | A1 | 6/2012 | Zeng et al. |
| 2013/0197758 | A1 | 8/2013 | Ueda et al. |
| 2014/0121880 | A1 | 5/2014 | Dolgov et al. |
| 2014/0188345 | A1 | 7/2014 | Tamura |
| 2014/0278059 | A1* | 9/2014 | Gunther ............. G01C 21/3697 |
| | | | 701/414 |
| 2014/0309884 | A1 | 10/2014 | Wolf |
| 2015/0166062 | A1 | 6/2015 | Johnson et al. |
| 2016/0052547 | A1 | 2/2016 | Kashiwai |
| 2016/0063865 | A1* | 3/2016 | Flemhmig ............. G08G 1/167 |
| | | | 348/46 |
| 2016/0200317 | A1 | 7/2016 | Danzl et al. |
| 2016/0306357 | A1 | 10/2016 | Wieskamp et al. |
| 2017/0116477 | A1 | 4/2017 | Chen et al. |
| 2017/0217431 | A1* | 8/2017 | Class ................. B60R 21/0134 |
| 2017/0236422 | A1* | 8/2017 | Naka ..................... B60W 30/12 |
| | | | 701/301 |
| 2018/0056986 | A1 | 3/2018 | Wang et al. |
| 2018/0074507 | A1* | 3/2018 | Gao ..................... G05D 1/0088 |
| 2018/0194349 | A1 | 7/2018 | McGill, Jr. |
| 2018/0281785 | A1 | 10/2018 | Berntorp et al. |
| 2018/0307245 | A1 | 10/2018 | Khawaja et al. |
| 2019/0011910 | A1* | 1/2019 | Lockwood ............. G08G 1/165 |
| 2019/0027034 | A1 | 1/2019 | Xu et al. |
| 2019/0047584 | A1* | 2/2019 | Donnelly ............. G05D 1/0088 |
| 2019/0113916 | A1* | 4/2019 | Guo ................. B60W 60/0015 |
| 2019/0243371 | A1* | 8/2019 | Nister .................. G05D 1/0231 |
| 2019/0256064 | A1* | 8/2019 | Hecker ............... B60W 30/095 |
| 2019/0317219 | A1* | 10/2019 | Smith ..................... G01S 17/58 |
| 2019/0339701 | A1* | 11/2019 | Pedersen ............. G05D 1/0044 |
| 2019/0355257 | A1* | 11/2019 | Caldwell ............. B60W 30/095 |
| 2019/0369616 | A1* | 12/2019 | Ostafew ............. G01C 21/3658 |
| 2019/0369637 | A1* | 12/2019 | Shalev-Shwartz ..... G06V 20/56 |
| 2020/0174490 | A1* | 6/2020 | Ogale .................. G05D 1/0221 |
| 2021/0278849 | A1* | 9/2021 | Zhu ...................... G05D 1/0231 |

FOREIGN PATENT DOCUMENTS

| | | |
|---|---|---|
| CN | 106564495 | 4/2017 |
| CN | 107438754 | 12/2017 |
| CN | 108074010 | 5/2018 |
| CN | 108320500 | 7/2018 |
| CN | 108431549 | 8/2018 |
| CN | 108571344 | 9/2018 |
| DE | 102017204983 | 9/2018 |
| WO | WO 2017/050358 | 3/2017 |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

[No Author Listed], SAE International Standard J3016: Taxonomy and Definitions for Terms Related to On-Road Motor Vehicle Automated Driving Systems, Jan. 31, 2016, 30 pages.

PCT International Search Report and Written Opinion in International Application No. PCT/US2018/42465, dated Oct. 15, 2018, 10 pages.

U.S. Appl. No. 15/653,879, filed Jul. 19, 2017, Xu et al.

* cited by examiner

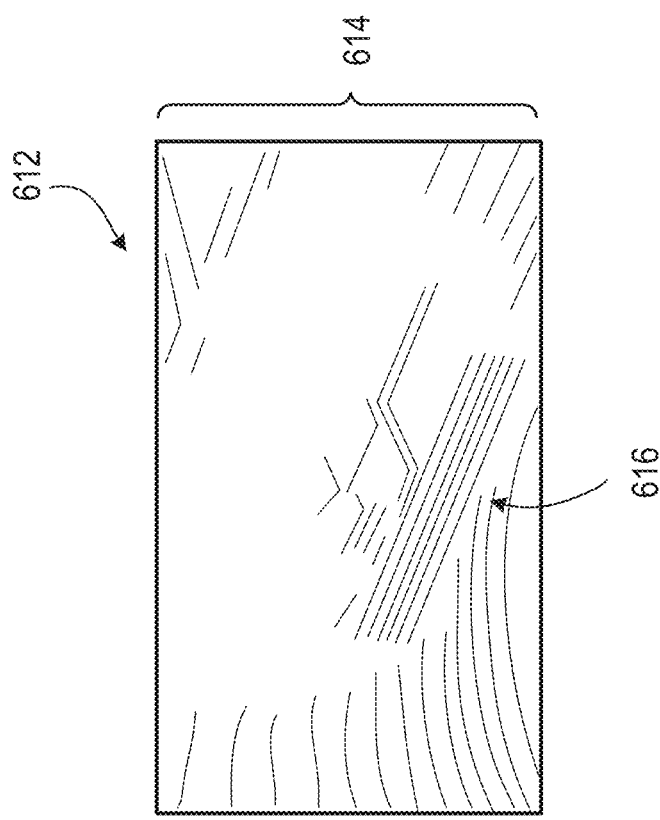
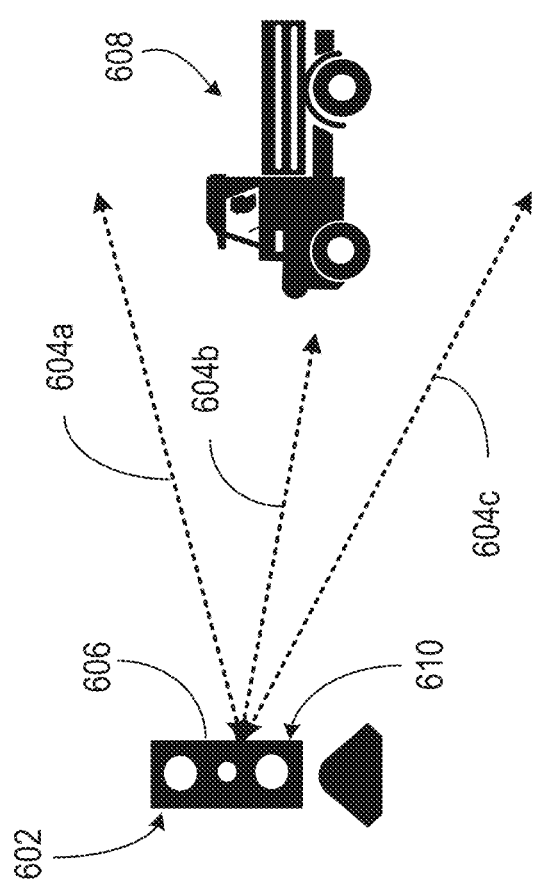
FIG. 6

3 Computation of the likelihood of collision $L_c$

Example of how to compute the likelihood of collision $L_c$ as a function of the trajectory and speed chosen.

By defining $P_E(t)$ as the set of points representing the ego car at time $t$, and similarly $P_O(t)$ the set of points representing the object at time $t$, the likelihood of collision at time $t$ $L_{c,t}$ can be expressed as $$L_{c,t} = p(P_E(t) \cap P_O(t) \neq \emptyset) \qquad (1)$$

with $p$ denoting probability.
Therefore, the total likelihood of collision (neglecting when that collision happens) can be expressed as $$L_c = \int_t L_{c,t} dt \qquad (2)$$

$P_E(t)$ is a function of the trajectory (which includes, or is complemented by the speed).

FIG. 16

ADJUSTING LATERAL CLEARANCE FOR A VEHICLE USING A MULTI-DIMENSIONAL ENVELOPE

CROSS-REFERENCE TO RELATED APPLICATIONS

This application claims the benefit of U.S. Provisional Application 62/752,294, filed on Oct. 29, 2018, and U.S. Provisional Application 62/810,341, filed on Feb. 25, 2019, both of which are incorporated herein by reference in their entirety.

FIELD OF THE INVENTION

This description relates to adjusting lateral clearance for a vehicle using a multi-dimensional envelope.

BACKGROUND

When a vehicle is navigating within a road network, objects such as other vehicles or pedestrians may be present or may intrude into the lane causing the vehicle to slow down or stop. Traditional navigation systems for vehicles often rely on detailed statistical models of the driving environment to make driving decisions. However, such detailed statistical models may be too complex to analyze on the fly. Other navigation systems may be conservative, resulting in the vehicle stopping when sensing any nearby object. Moreover, traditional, reactive navigation systems that are used for vehicles that follow predetermined routes from an initial location to a destination are often inadequate for route management. For rapidly changing driving conditions, reactive navigation systems can cause trip delays or collisions. Therefore, there is a need for a more flexible approach to route management for vehicles.

SUMMARY

Techniques are provided for adjusting lateral clearance for a vehicle using a multi-dimensional envelope. One or more processors of the vehicle generate a trajectory for the vehicle. The trajectory includes a connected plurality of spatiotemporal locations beginning at an initial spatiotemporal location and terminating at a destination spatiotemporal location. A multi-dimensional envelope is generated indicating a drivable region for the vehicle. The multi-dimensional envelope contains the trajectory. One or more objects are identified that are located on or adjacent to the trajectory. A dimension of the multi-dimensional envelope is adjusted to increase a lateral clearance between the vehicle and the identified objects. A control module of the vehicle navigates the vehicle along the multi-dimensional envelope to increase the lateral clearance between the vehicle and the other objects.

In one embodiment, using one or more processors of a vehicle, a multi-dimensional envelope is generated indicating a drivable region for the vehicle. Using the one or more processors, a lateral error tolerance is determined with respect to an object for at least one side of the generated multi-dimensional envelope. The object is identified using sensor data. Using the lateral error tolerance, at least one dimension of the generated multi-dimensional envelope is adjusted to alter a lateral clearance between the vehicle and the identified object, responsive to the determined lateral error tolerance being less than a threshold value. Using a control circuit of the vehicle, the vehicle is navigated in accordance with the adjusted multi-dimensional envelope.

In one embodiment, the generating of the trajectory includes receiving the trajectory from a remote server or an input device located within the vehicle.

In one embodiment, the identifying of the one or more objects includes identifying the one or more objects, wherein the vehicle has a likelihood of collision with the one or more objects greater than zero.

In one embodiment, the adjusting of the dimension of the generated multi-dimensional envelope is based on a speed of the vehicle, an acceleration, or a magnitude of jerk.

In one embodiment, the generated multi-dimensional envelope corresponds to a shape having a geometric volume.

In one embodiment, the geometric volume is tubular, cubic, or conical.

In one embodiment, the multi-dimensional envelope is generated using information contained within a map of an environment containing the vehicle.

In one embodiment, the information contained within the map of the environment represents a road, a parking lot, a bridge, a construction zone, a curb of a road, a boundary of a lane, an intersection, or a building of the environment.

In one embodiment, the multi-dimensional envelope is generated using information describing the identified one or more objects.

In one embodiment, the one or more sensors include a monocular video camera, a stereo video camera, a visible light camera, an infrared camera, a thermal imager, a LiDAR, a radar, an ultrasonic sensor, a time-of-flight (TOF) depth sensor, a speed sensor, a temperature sensor, a humidity sensor, or a precipitation sensor.

In one embodiment, the one or more sensors include an inertial measurement unit (IMU), a wheel speed sensors, a wheel brake pressure sensor, a braking torque sensor, an engine torque sensor, a wheel torque sensor, a steering angle sensor, or an angular rate sensor.

In one embodiment, the identified one or more objects include other vehicles.

In one embodiment, the identified one or more objects include pedestrians or cyclists.

In one embodiment, the identified one or more objects include construction zones or curbs.

In one embodiment, the generating of the multi-dimensional envelope includes sampling the trajectory to identify the plurality of spatiotemporal locations. A lateral error tolerance is determined with respect to the identified one or more objects for each spatiotemporal location of the plurality of spatiotemporal locations. The multi-dimensional envelope is generated using the determined lateral error tolerance for each spatiotemporal location of the plurality of spatiotemporal locations.

In one embodiment, the generating of the multi-dimensional envelope includes determining a width of the multi-dimensional envelope using a lateral error tolerance with respect to the identified one or more objects for a side of the multi-dimensional envelope.

In one embodiment, the likelihood of collision for the vehicle with the identified one or more objects is determined using a speed constraint for the vehicle, wherein the vehicle is traveling along the trajectory between a present spatiotemporal location of the vehicle and a spatiotemporal location on the trajectory where the trajectory intersects a boundary of a lane, and wherein the vehicle is traveling within the lane. Examples of speed constraints include a maximum or minimum legal speed limit, a speed of another object such as another moving vehicle that is ahead of the vehicle, a mechanical limitation of the vehicle, a speed limit based on component failure of the vehicle, a speed limit based on a weather condition, a user-preferred speed limit, or a speed limit based on a road feature such as an angle of curvature or gradient.

In one embodiment, the likelihood of collision for vehicle with the identified one or more objects is determined relative to a location on a longitudinal axis of the vehicle, wherein the location is situated away from a rear axle of the vehicle.

In one embodiment, the generating of the multi-dimensional envelope further includes determining a distance of the vehicle from a physical curb, a boundary of the lane, or an intersection of the lane with another lane.

In one embodiment, the adjusting of the dimension of the generated multi-dimensional envelope further includes reducing the dimension of the multi-dimensional envelope prior to the vehicle navigating from the lane to a second lane.

In one embodiment, the adjusting of the dimension of the multi-dimensional envelope includes receiving, from the one or more sensors, passenger data of a passenger in the vehicle. The dimension is adjusted using the passenger data.

In one embodiment, the multi-dimensional envelope is generated using information representing a vehicular maneuver that the vehicle is performing.

In one embodiment, the vehicular maneuver includes a lane change, passing another vehicle, parallel parking, a two-point turn, a left turn, a right turn, navigating a traffic circle, moving over for an emergency vehicle, turning into a parking lot, or merging onto a highway.

In one embodiment, the navigating of the vehicle along the multi-dimensional envelope includes determining, using the control module, a centerline of the adjusted multi-dimensional envelope. The vehicle is navigated along the determined centerline of the multi-dimensional envelope.

In one embodiment, a vehicle includes one or more computer processors. One or more non-transitory storage media store instructions which, when executed by the one or more computer processors, cause performance of the method of any one of the claims disclosed herein.

In one embodiment, one or more non-transitory storage media store instructions which, when executed by one or more computing devices, cause performance of the method of any one of the claims disclosed herein.

In one embodiment, a method includes performing a machine-executed operation involving instructions which, when executed by one or more computing devices, cause performance of the method of any one of the claims disclosed herein, wherein the machine-executed operation is at least one of sending said instructions, receiving said instructions, storing said instructions, or executing said instructions.

In one embodiment, a vehicle includes a perception module configured to identify one or more objects, wherein the vehicle has a likelihood of collision with the one or more objects greater than zero. A planning module is communicatively coupled to the perception module and configured to generate a trajectory for the vehicle. A multi-dimensional envelope is generated indicating a drivable region for the vehicle and containing the trajectory. A dimension of the generated multi-dimensional envelope is adjusted to adjust a lateral clearance between the vehicle and one or more objects. A control module is communicatively coupled to the planning module and configured to receive the adjusted multi-dimensional envelope from the planning module. A centerline is determined of the adjusted multi-dimensional envelope. The vehicle navigates along the determined centerline of the multi-dimensional envelope.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 illustrates an example of a LiDAR system, in accordance with one or more embodiments.

FIG. 16 illustrates an example of determining a likelihood of collision based on a trajectory and a speed of a vehicle, in accordance with one or more embodiments.

DETAILED DESCRIPTION

Figure 1:
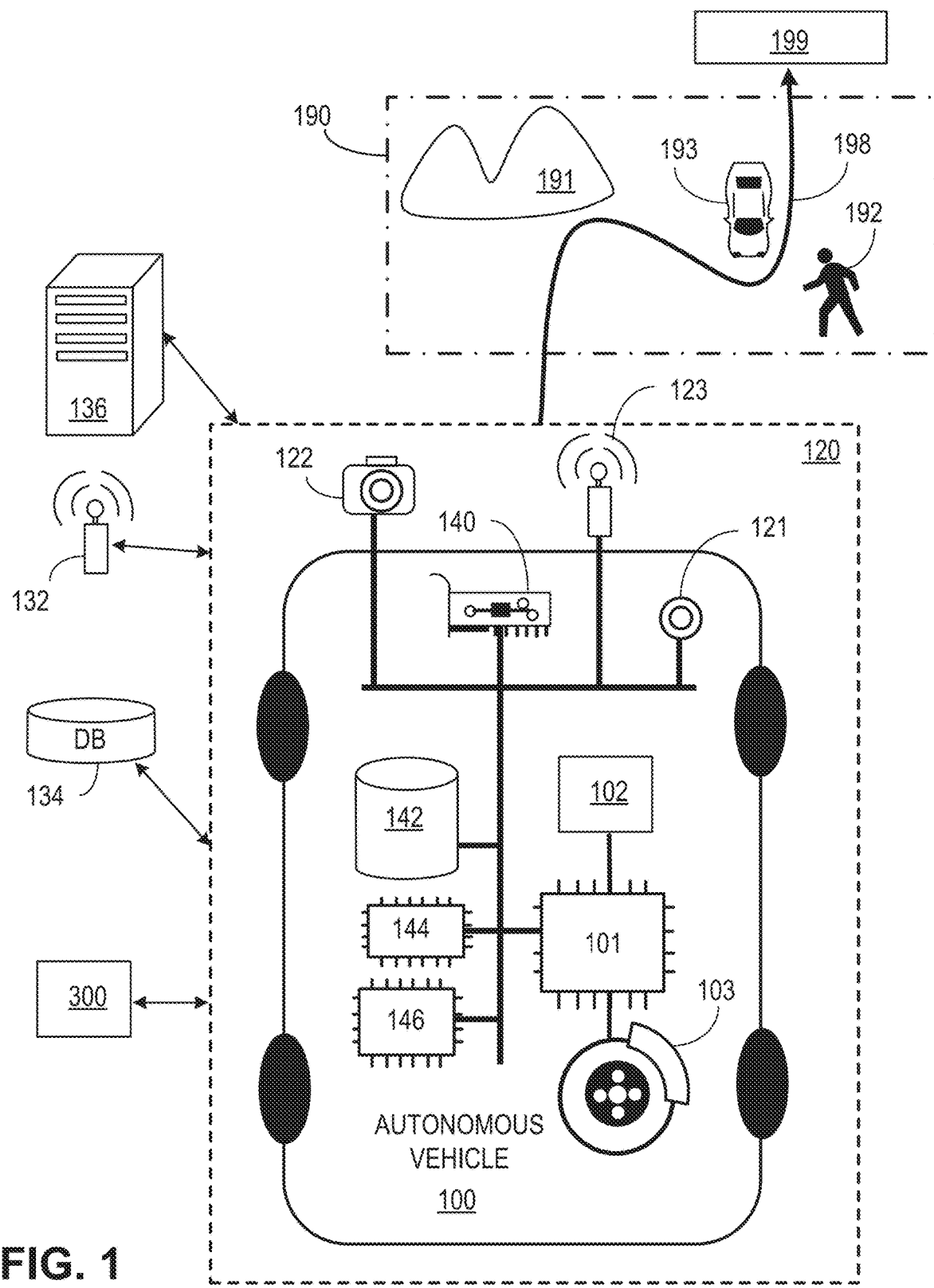
FIG. 1 illustrates an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are illustrated in block diagram form in order to avoid unnecessarily obscuring the present invention.

In the drawings, specific arrangements or orderings of schematic elements, such as those representing devices, modules, instruction blocks and data elements, are illustrated for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Architecture for Adjusting Lateral Clearance
8. Example of Adjusting Lateral Clearance
9. Process for Adjusting Lateral Clearance General Overview An AV that is traveling from an initial spatiotemporal location to a destination spatiotemporal location encounters environmental features (such as curbs) or objects (such as other vehicles) on the road network. The embodiments disclosed herein relate to adjusting a lateral clearance between the AV and other vehicles or environmental features on the road network. A present position of the AV is monitored and correlated to the position of potential hazards along its path in order to adjust the AV's freedom of lateral movement. A multi-dimensional envelope is generated that accounts for the AV's physical presence and operating tolerance. The envelope is defined by a variable space surrounding the AV wherein the AV is physically present as it travels along its intended trajectory. The shape and size of the envelope is dynamically varied to meet safety requirements for the road conditions facing the AV as well as increase passenger comfort. Dimensions of the envelope are adjusted by identifying other objects on the road, intersections between the AV's trajectory and other vehicles, and changing traffic conditions.

In particular, methods, systems, and an apparatus for adjusting a lateral clearance for an AV using a multi-dimensional envelope are disclosed. One or more processors of the AV are used to generate or receive a route or a trajectory for the vehicle. A multi-dimensional envelope is generated that represents a tolerance on a lateral error $E_L$ per sampled location L on the trajectory. The multi-dimensional envelope indicates a drivable region for the AV based on static map information and dynamic tracked objects. The multi-dimensional envelope contains the trajectory. The multi-dimensional envelope is contained within the environment.

One or more objects located within the environment are identified. A dimension of the multi-dimensional envelope is adjusted to increase a lateral clearance between the AV and another identified object within the environment. The adjusting of the dimension of the multi-dimensional envelope reduces the likelihood of collision $L_C$ of the objects with the AV and the identified objects (e.g., active vehicles, inactive vehicles, pedestrians, bicyclists, and/or construction zones). A control module of the vehicle navigates the vehicle along the multi-dimensional envelope to increase lateral clearance.

Hardware Overview

FIG. 1 illustrates an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transposition of goods or people. For example, cars, buses, trains, airplanes, drones, trucks, boats, ships, submersibles, dirigibles, etc. A driverless car is an example of an AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.).

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having two lanes between the lane markings. A lane may also be independent of the markings. For example, if another vehicle is temporarily parked ahead of a navigating vehicle and is occupying a portion of a marked lane in which the navigating vehicle is driving, a new "lane" may be defined to be the remaining portion of the marked lane and a portion of an adjacent marked lane.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor" includes one or more physical components that detect information about the environment surrounding the physical components. Some of the physical components can include electronic components such as analog-to-digital converters, a buffer (such as a RAM and/or a nonvolatile storage) as well as data processing components such as an ASIC (application-specific integrated circuit), a microprocessor and/or a microcontroller.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with reference to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies descried in this document also are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 autonomously or semi-autonomously along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors E. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GNSS (Global Navigation Satellite System) sensors, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, radar, ultrasonic sensors, time-of-flight (TOF)

depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Cloud Computing Environment

Figure 2:
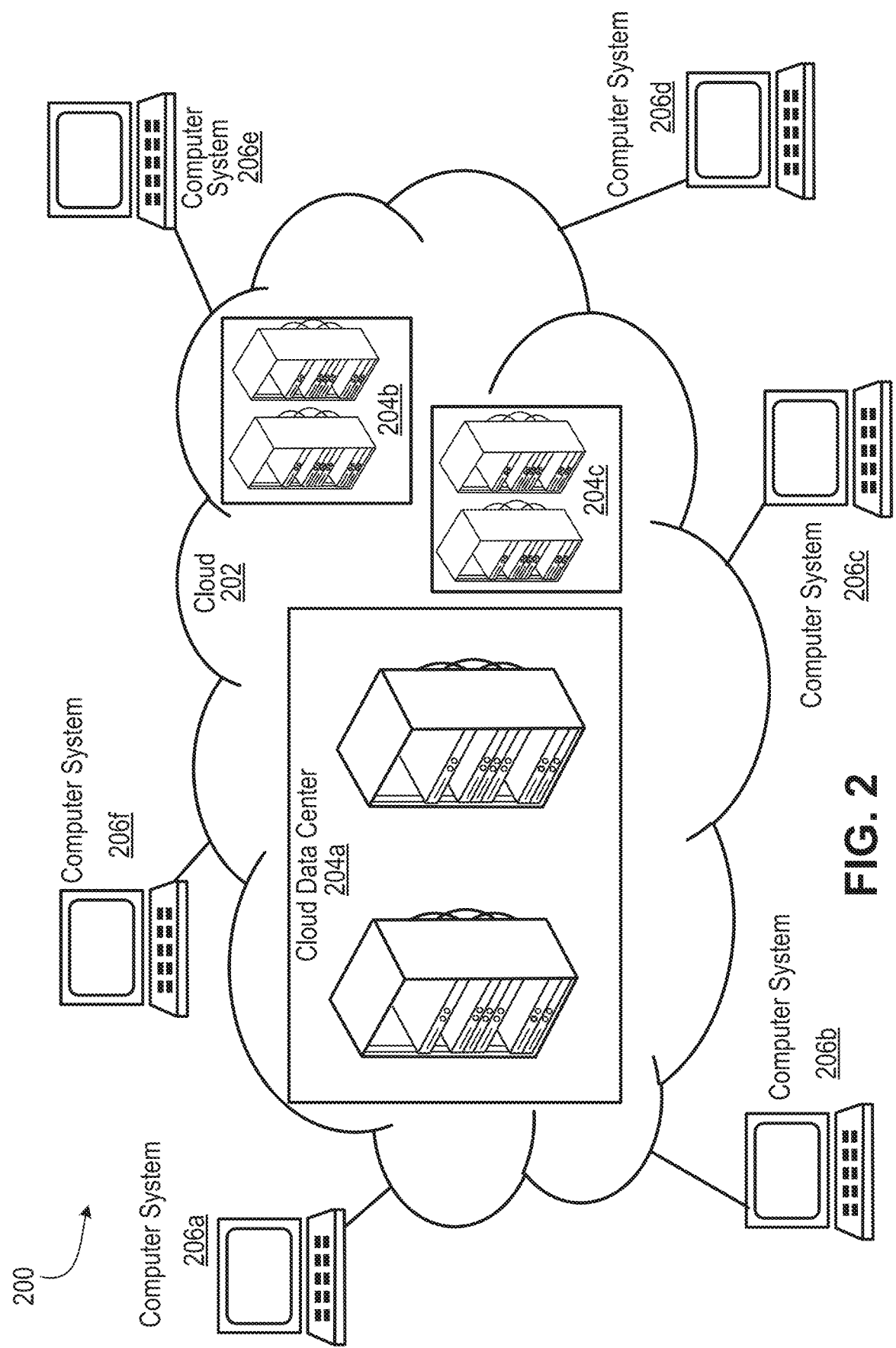
FIG. 2 illustrates an exemplary "cloud" computing environment, in accordance with one or more embodiments.

FIG. 2 illustrates an exemplary "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a illustrated in FIG. 2, refers to the physical arrangement of servers that make up a cloud, for example the cloud 202 illustrated in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, IoT devices, autonomous vehicles (including, cars, drones, shuttles, trains, buses, etc.) and consumer electronics. In an embodiment, the computing systems 206a-f are implemented in or as a part of other systems.

Computer System

Figure 3:
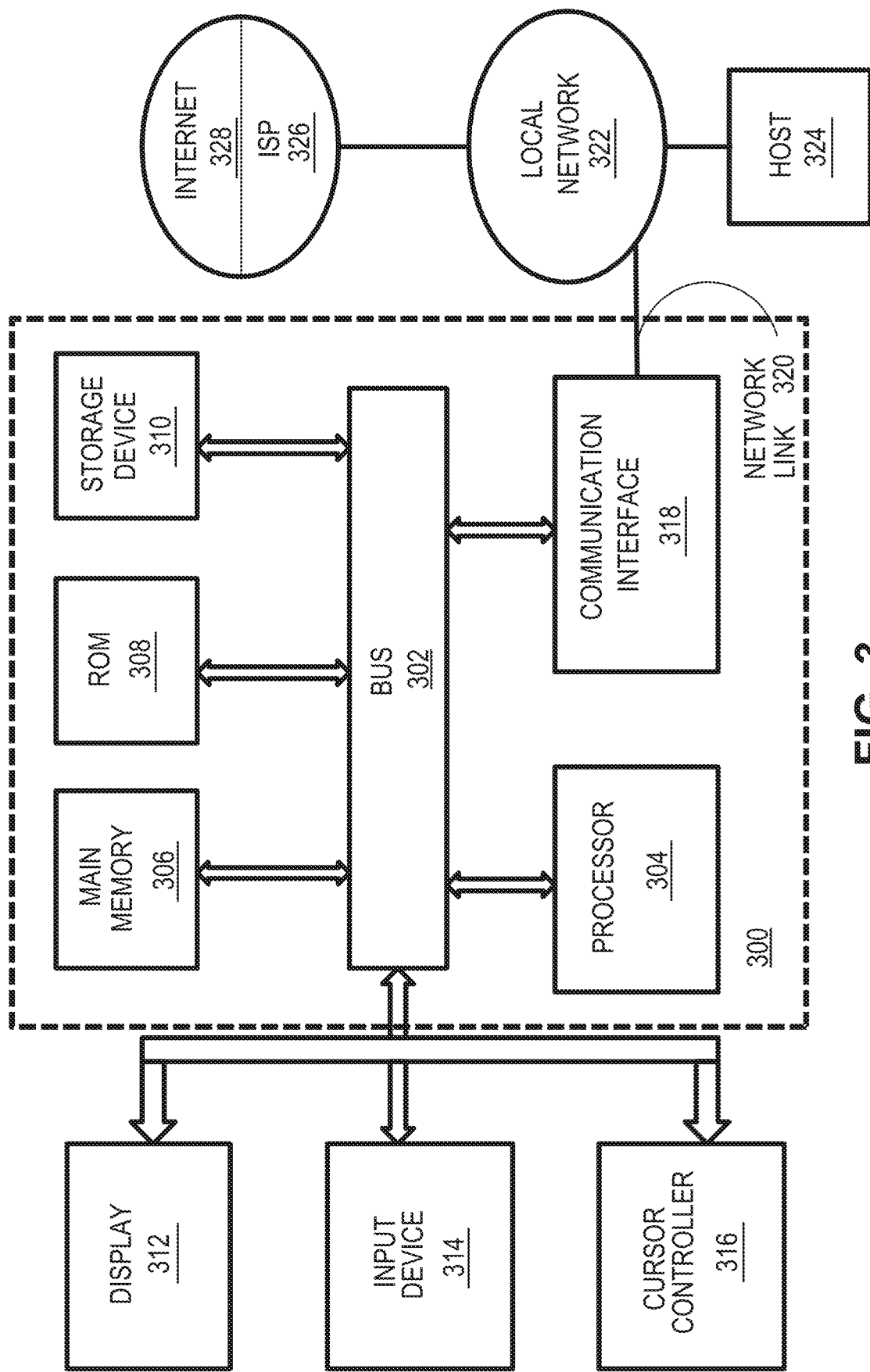
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
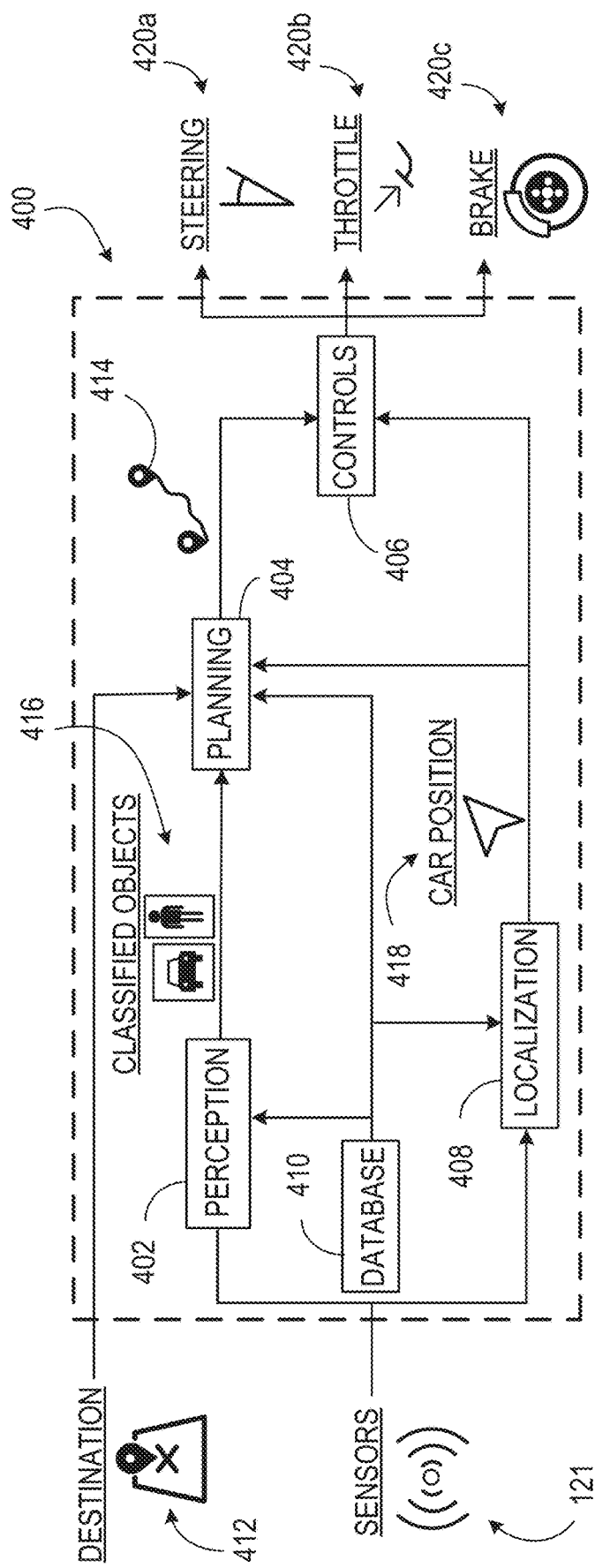
FIG. 4 illustrates an example architecture for an AV, in accordance with one or more embodiments.

FIG. 4 illustrates an example architecture 400 for an autonomous vehicle (e.g., the AV 100 illustrated in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 illustrated in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also illustrated in FIG. 1. The objects are classified (e.g., grouped into types such as pedestrian, bicycle, automobile, traffic sign, etc.) and data representing the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
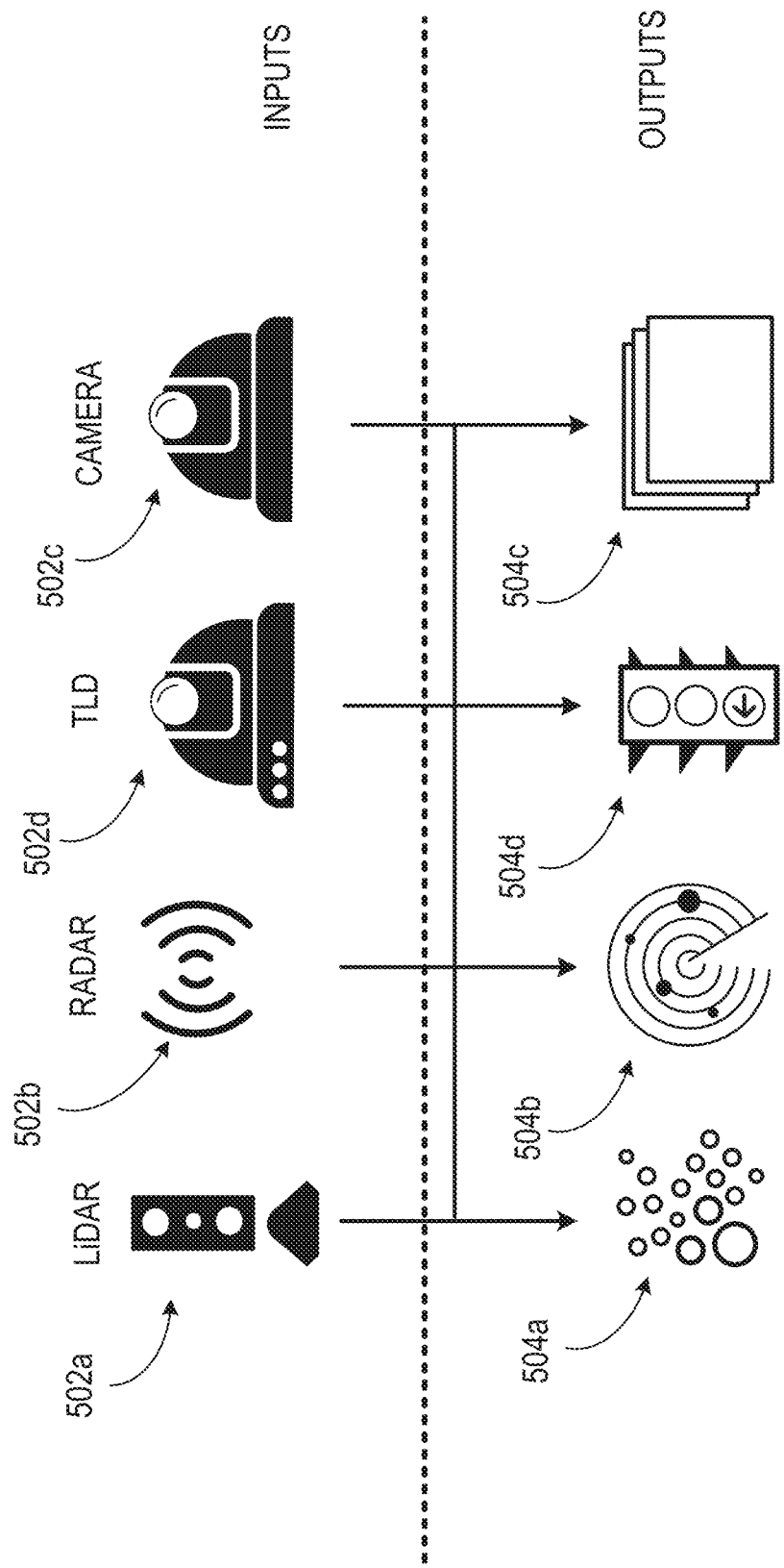
FIG. 5 illustrates an example of inputs and outputs that may be used by a perception module, in accordance with one or more embodiments.

FIG. 5 illustrates an example of inputs 502a-d (e.g., sensors 121 illustrated in FIG. 1) and outputs 504a-d (e.g., sensor data) that is used by the perception module 402 (FIG. 4). One input 502a is a LiDAR (Light Detection And Ranging) system (e.g., LiDAR 123 illustrated in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a radar system. Radar is a technology that uses radio waves to obtain data about nearby physical objects. Radars can obtain data about objects not within the line of sight of a LiDAR system. A radar system 502b produces radar data as output 504b. For example, radar data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as illustrated in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Example of a LiDAR System

FIG. 6 illustrates an example of a LiDAR system 602 (e.g., the input 502*a* illustrated in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

LiDAR System in Operation

Figure 7:
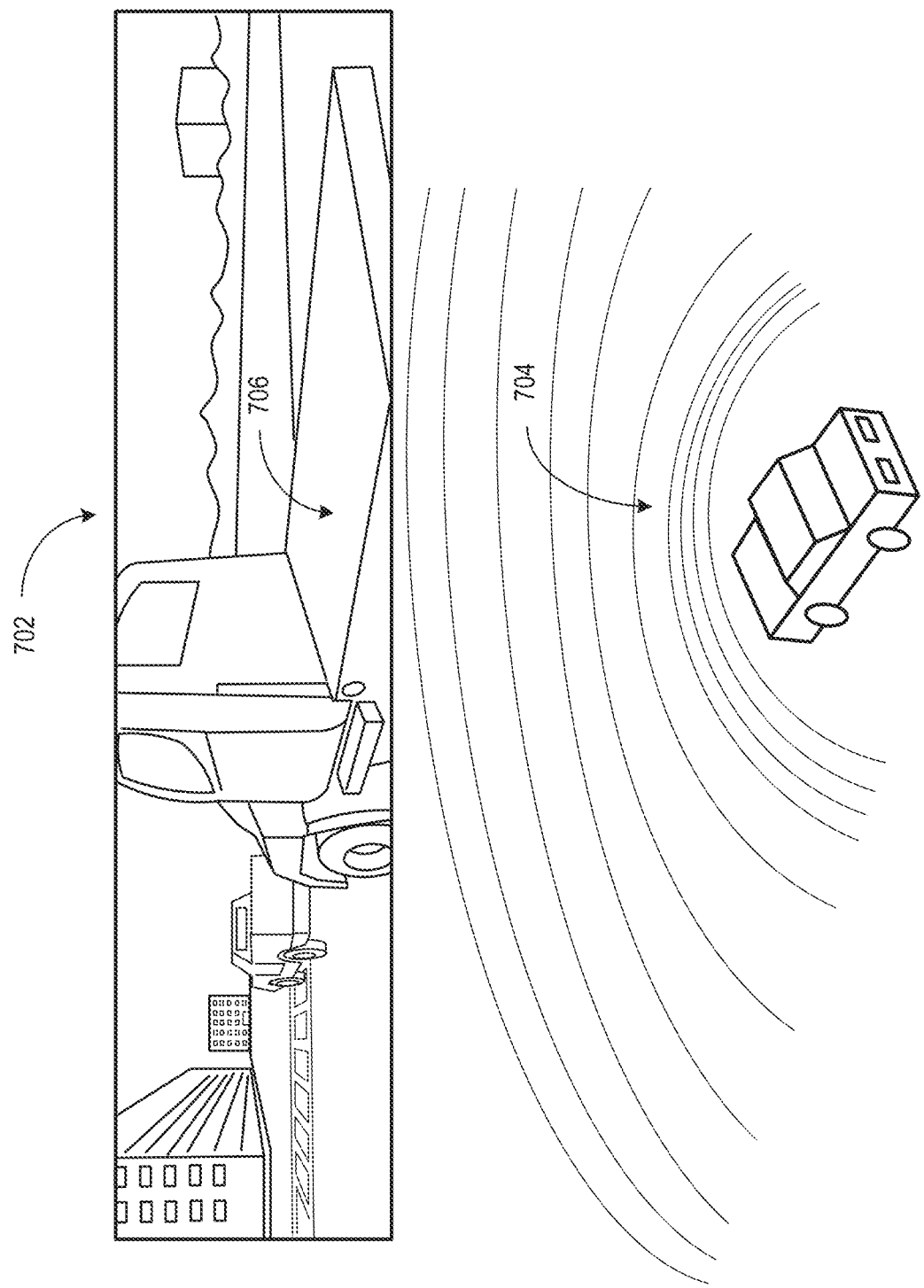
FIG. 7 illustrates the LiDAR system in operation, in accordance with one or more embodiments.

FIG. 7 illustrates the LiDAR system 602 in operation. In the scenario illustrated in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
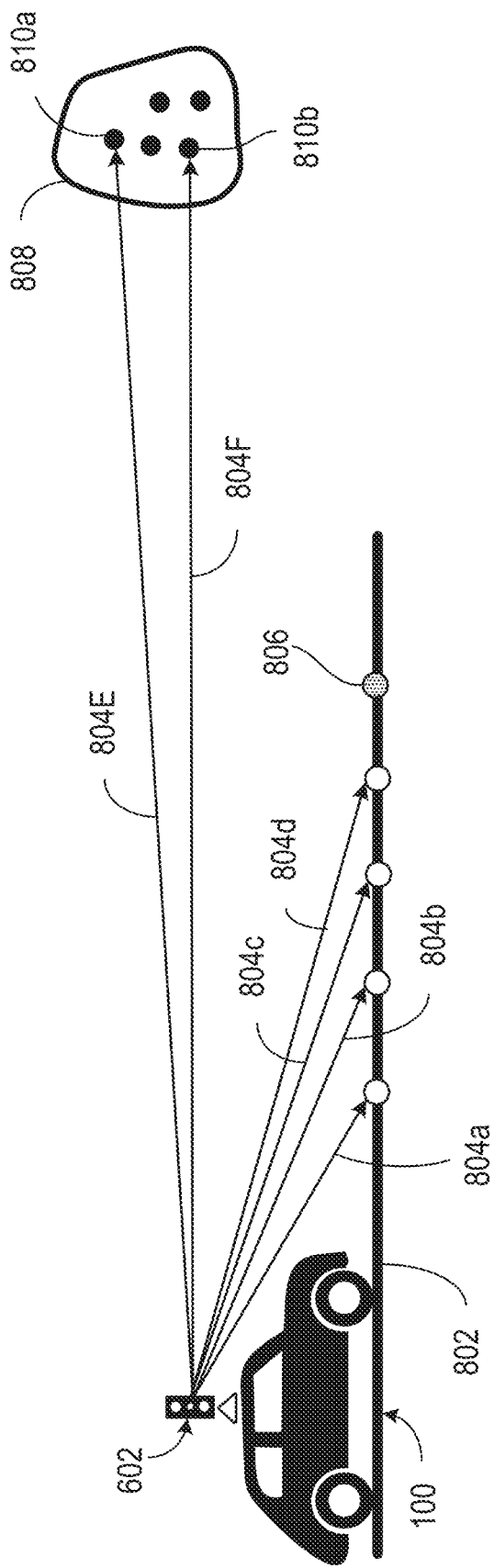
FIG. 8 illustrates the operation of the LiDAR system in additional detail, in accordance with one or more embodiments.

FIG. 8 illustrates the operation of the LiDAR system 602 in additional detail. As described above, the AV 100 detects the boundary of a physical object based on characteristics of the data points detected by the LiDAR system 602. As illustrated in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Autonomous Vehicle Planning

Figure 9:
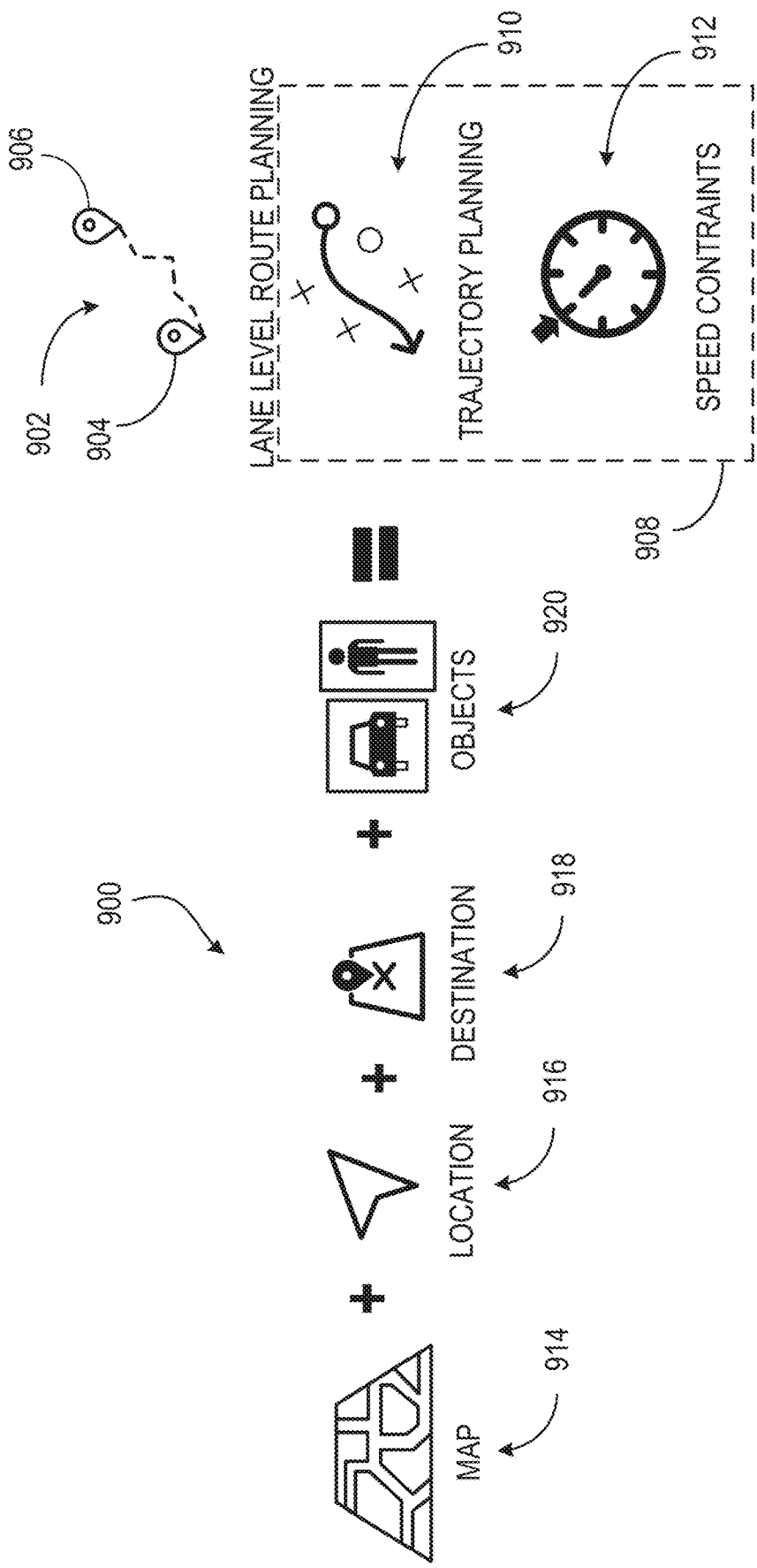
FIG. 9 illustrates a block diagram of the relationships between inputs and outputs of a planning module, in accordance with one or more embodiments.

FIG. 9 illustrates a block diagram 900 of the relationships between inputs and outputs of a planning module 404 (e.g., as illustrated in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 illustrated in FIG. 4), current location data 916 (e.g., the AV position 418 illustrated in FIG. 4), destination data 918 (e.g., for the destination 412 illustrated in FIG. 4), and object data 920 (e.g., the classified objects 416 as perceived by the perception module 402 as illustrated in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Path Planning

Figure 10:
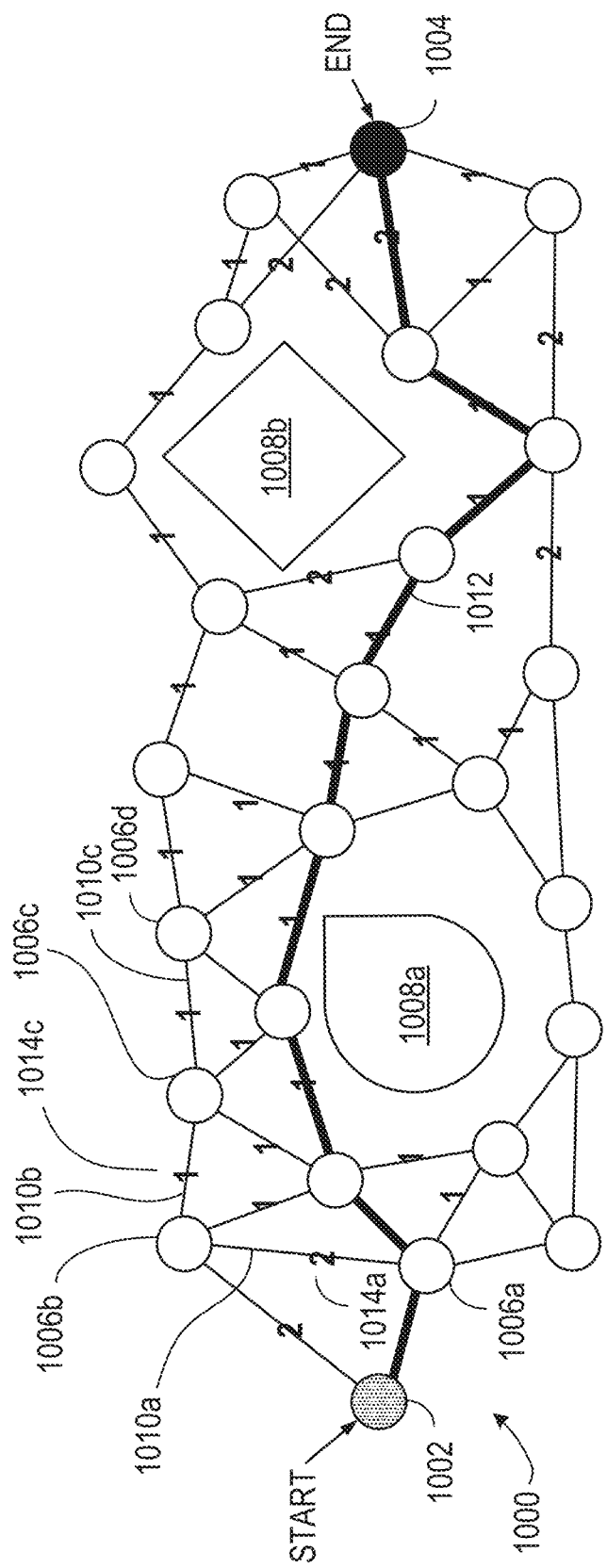
FIG. 10 illustrates a directed graph used in path planning, in accordance with one or more embodiments.

FIG. 10 illustrates a directed graph 1000 used in path planning, e.g., by the planning module 404 (FIG. 4). In general, a directed graph 1000 like the one illustrated in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
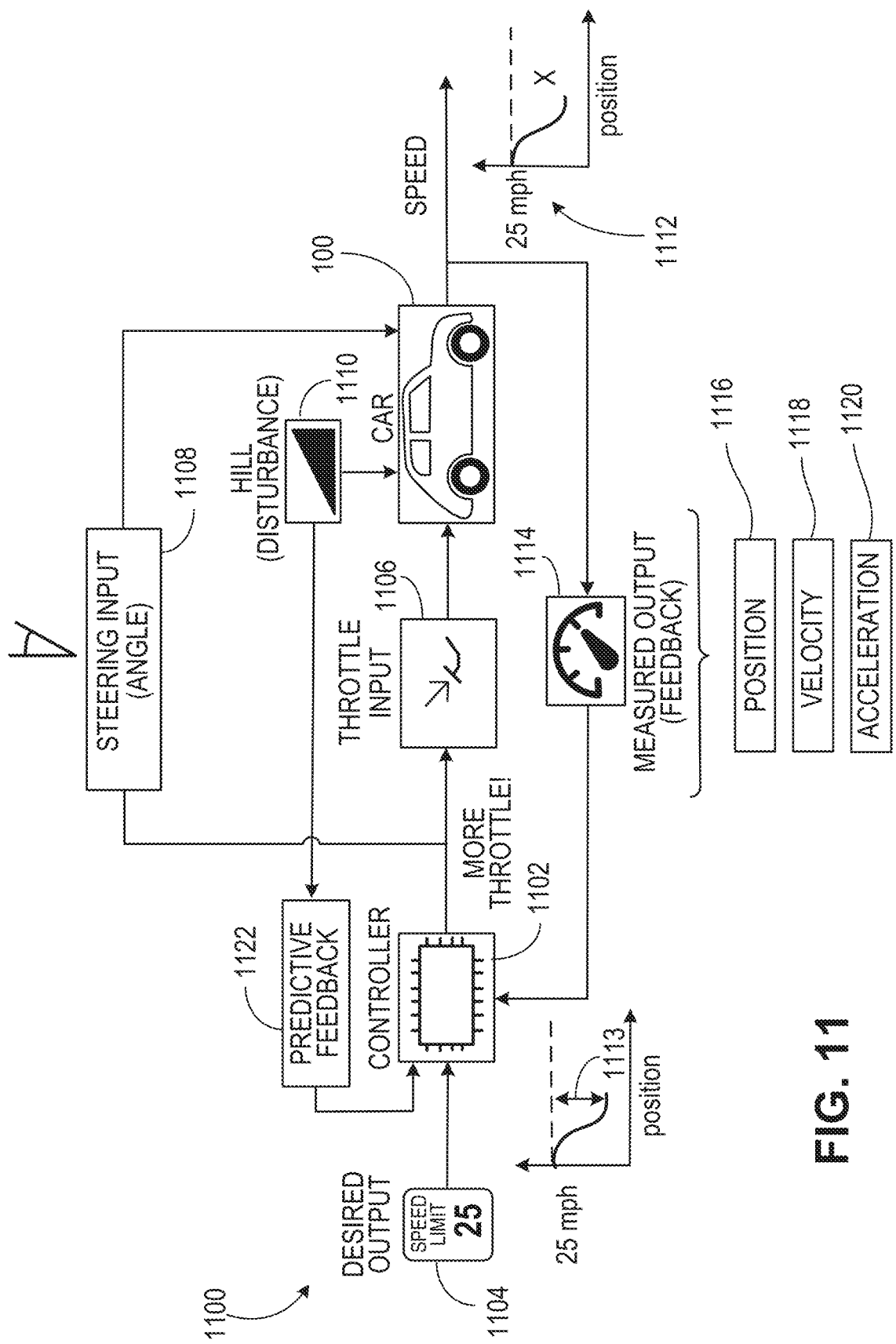
FIG. 11 illustrates a block diagram of the inputs and outputs of a control module, in accordance with one or more embodiments.

FIG. 11 illustrates a block diagram 1100 of the inputs and outputs of a control module 406 (e.g., as illustrated in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as illustrated in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Block Diagram of the Inputs, Outputs, and Components of the Controller

Figure 12:
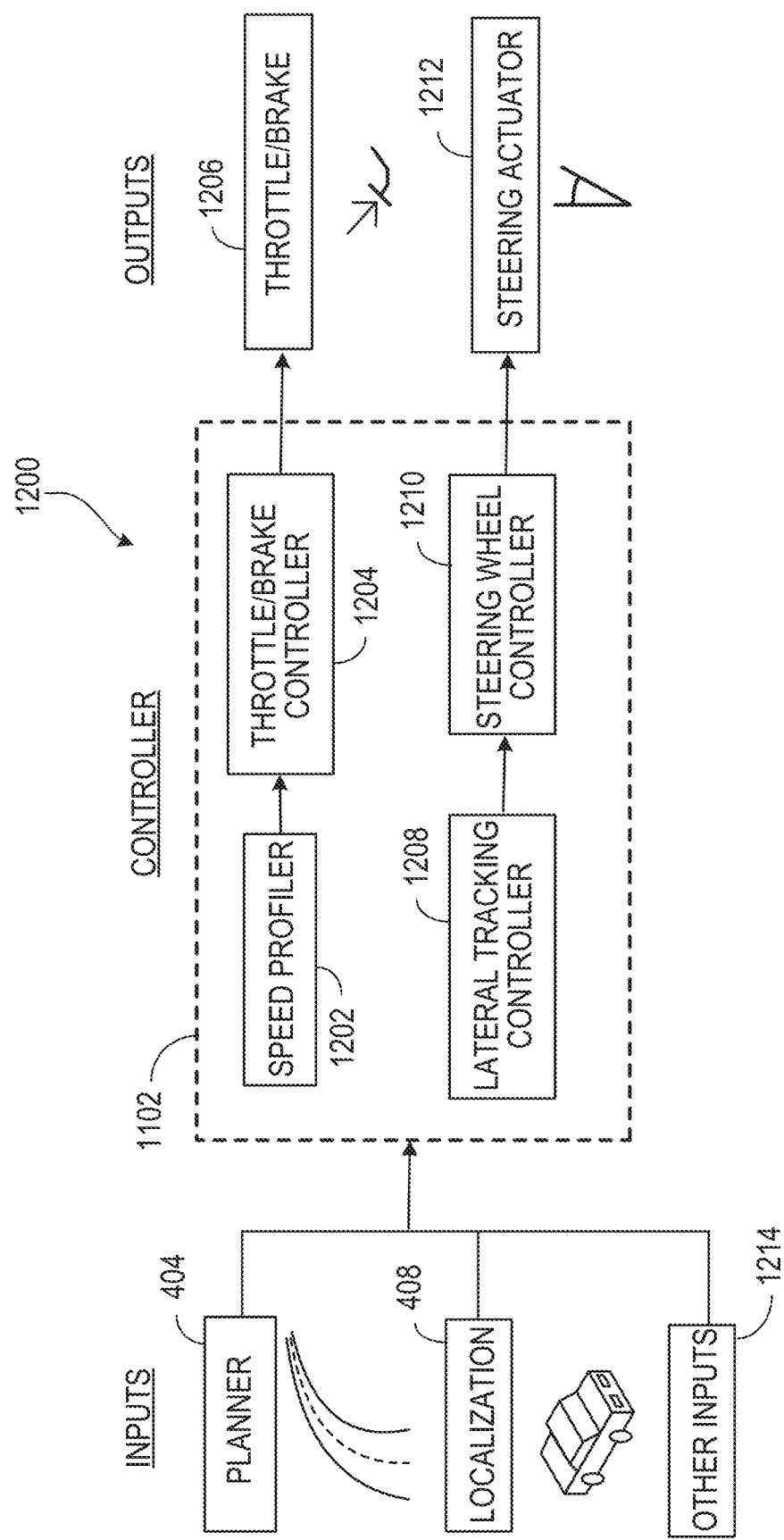
FIG. 12 illustrates a block diagram of the inputs, outputs, and components of a controller, in accordance with one or more embodiments.

FIG. 12 illustrates a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Architecture for Adjusting Lateral Clearance Using a Multi-Dimensional Envelope

Figure 13:
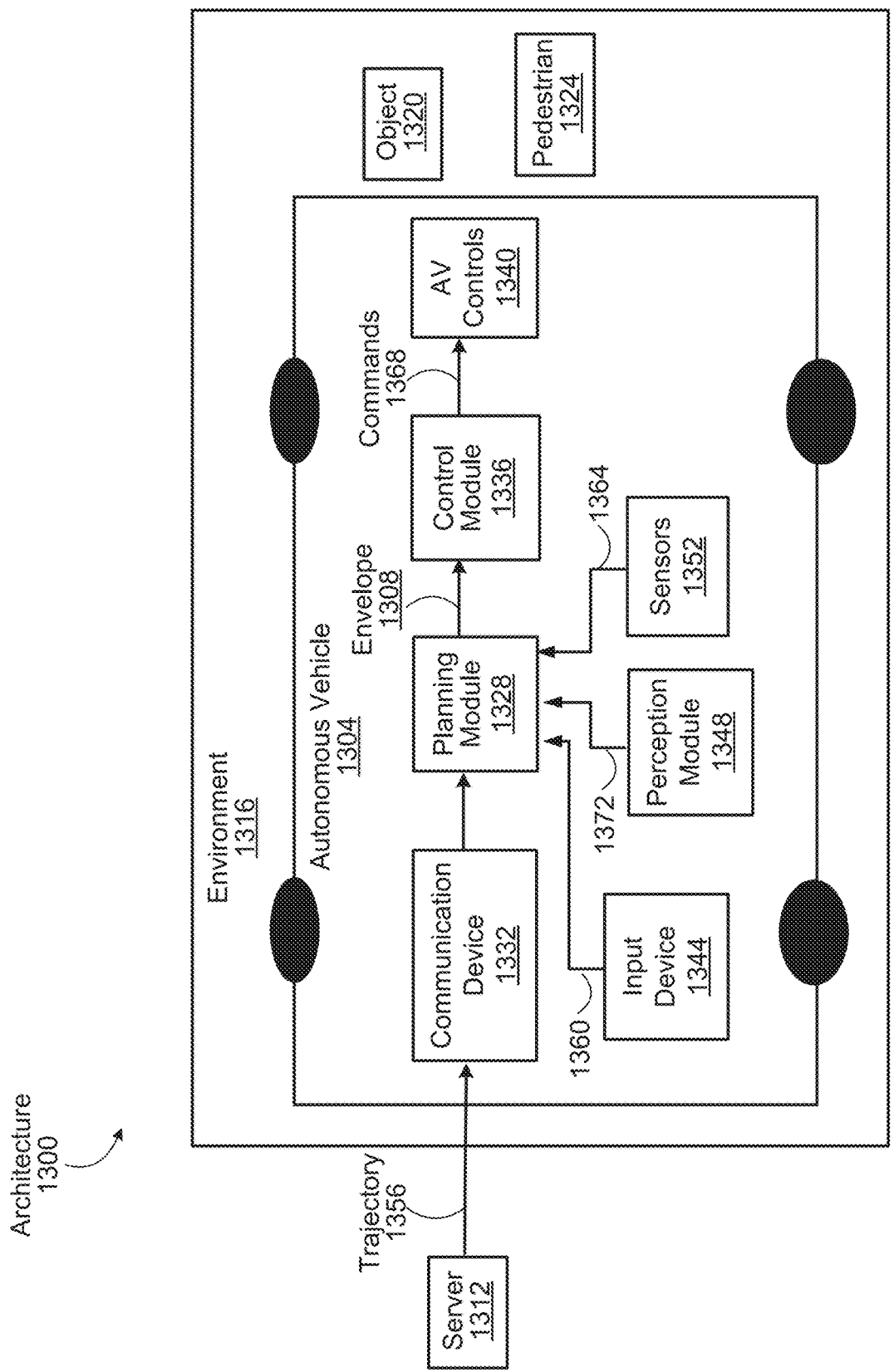
FIG. 13 illustrates a block diagram of an architecture for adjusting lateral clearance using a multi-dimensional envelope, in accordance with one or more embodiments.

FIG. 13 illustrates a block diagram of an architecture 1300 for adjusting lateral clearance for an AV 1304 using a multi-dimensional envelope 1308, in accordance with one or more embodiments. The architecture 1300 includes a remote server 1312 and an environment 1316 surrounding the AV 1304. The server 1312 may be an embodiment of the server 136 illustrated in FIG. 1 and the AV 1304 may be an embodiment of the AV 100 illustrated in FIG. 1.

The environment 1316 represents a geographical area, such as a town, a neighborhood, or a road segment. In one embodiment, spatiotemporal locations within the environment 1316 are represented on an annotated map of the environment 1316. These spatiotemporal locations are used to generate a trajectory for the AV 1304. The environment 1316 contains the AV 1304 and objects 1320 and 1324. In other embodiments, the architecture 1300 includes additional or fewer components than those described herein. Similarly, the functions can be distributed among the components and/or different entities in a different manner than is described here.

The server 1312 is communicatively coupled to the AV 1304 and transmits information to the AV 1304. In one embodiment, the server 1312 may be a "cloud" server as described in more detail above with reference to server 136 in FIGS. 1 and 2. Portions of the server 1312 may be implemented in software or hardware. For example, the server 1312 or a portion of the server 1308 may be part of a PC, a tablet PC, an STB, a smartphone, an internet of things (IoT) appliance, or any machine capable of executing instructions that specify actions to be taken by that machine.

The objects 1320 and 1324 are physical objects external to the AV 1304. In one embodiment, the object 1320 is another vehicle, a cyclist, an element of a construction zone, a building, a traffic sign, etc. The object 1324 is a pedestrian. In one embodiment, the objects 1320 and 1324 are classified by the AV 1304 (e.g., grouped into types such as pedestrian, automobile, etc.) and data representing the classified objects 1320 and 1324 is provided to the planning module 1328 of the AV 1304 to generate a trajectory for the AV 1304. Objects external to the AV 1304 are described in more detail above with reference to objects 416 in FIGS. 4 and 5.

The AV 1304 includes a communication device 1332, the planning module 1328, a control module 1336, AV controls 140 (e.g., steering, brakes, throttle), an input device 1344, a perception module 1348, and one or more sensors 1352. The communication device 1332 may be an embodiment of the communication device 140 illustrated in FIG. 1, the planning module 1328 may be an embodiment of the planning module 404 illustrated in FIG. 4, the control module 1336 may be an embodiment of the control module 106 illustrated in FIG. 1, the AV controls 1340 may be an embodiment of the controls 420*a-c* illustrated in FIG. 4, the input device 1344 may be an embodiment of the input device 314 illustrated in FIG. 3, the perception module 1348 may be an embodiment of the perception module 402 illustrated in FIG. 4, and the sensors 1352 may include any one or more of the sensors 121-123 illustrated in FIG. 1. In other embodiments, the AV 1304 includes additional or fewer components than those described herein. Similarly, the functions can be distributed among the components and/or different entities in a different manner than is described here.

The communication device 1332 communicates information, such as instructions, a trajectory 1356, or measured or inferred properties of the AV 1304's or other vehicles' states and conditions, etc., with the server 1312, a passenger within the AV 1304, or other vehicles. The communication device 1332 is communicatively coupled to the server 1312 across a network. In an embodiment, the communications device 1332 communicates across the Internet, an electromagnetic spectrum (including radio and optical communications), or other media (e.g., air and acoustic media). Portions of the communication device 1332 may be implemented in software or hardware. For example, the communication device 1332 or a portion of the communication device 1332 may be part of a PC, a tablet PC, an STB, a smartphone, a IoT appliance, or any machine capable of executing instructions that specify actions to be taken by that machine.

Referring again to FIG. 13, in one embodiment, the communication device 1332 receives a trajectory 1356 for the AV 1304 from the server 1312. The trajectory 1356 includes a plurality of spatiotemporal locations for the AV 1304. The trajectory 1356 may be similar to the trajectory 198 described above with reference to FIG. 1. Each spatiotemporal location of the plurality of spatiotemporal locations on the trajectory 1356 includes geographical coordinates, a time associated with the AV 1304 located at the geographical coordinates (e.g., GNSS coordinates), or a heading (directional orientation or pose) of the AV 1304 located at the geographical coordinates.

The planning module 1328 generates a trajectory for the AV 1304. In one embodiment, the generated trajectory is the trajectory 1356 received from the communication device 1332. The planning module 1328 is communicatively coupled to the communication device 1332 to receive instructions or information representing the trajectory 1356 from the server 1312. In one embodiment, portions of the planning module 1328 are implemented in software or hardware. For example, the planning module 1328 or a portion of the planning module 1328 may be part of a PC, a tablet PC, an STB, a smartphone, a IoT appliance, or any machine capable of executing instructions that specify actions to be taken by that machine. The planning module 1328 is described in more detail above with reference to planning module 404 in FIG. 4.

In one embodiment, the planning module 1328 generates a trajectory for the AV 1304 based on information 1360 received from a passenger within the AV 1304 via the input device 1344. The planning module 1328 uses a directed graph representation of the road network to generate the trajectory, as illustrated and described in detail above with reference to FIG. 10. The planning module 1328 generates a multi-dimensional envelope 1308 to navigate the AV 1304 along the trajectory and adjust a lateral clearance for the AV 1304 from objects 1320 and 1324. The multi-dimensional envelope 1308 indicates a drivable region for the AV 1308. The multi-dimensional envelope 1308 contains the trajectory and represents a magnitude of spatial freedom for the AV 1304 to maneuver laterally.

The planning module 1328 generates and adjusts the dimensions of the multi-dimensional envelope 1308 using information from multiple sources. In some embodiments, the perception module 1348 identifies one or more objects 1320 or pedestrians 1324 located within a threshold distance to the trajectory. The perception module 1348 identifies the objects 1320 or pedestrians 1324 using the sensor data 1364 from the one or more sensors 1352 of the AV 1304. In some embodiments, the threshold distance is a physical distance, such as 1 meter or 3 feet. In other embodiments, the threshold distance is a fraction of a length ("l") of the AV 1304. For example, the threshold distance can be set to 0.25×l or 0.5×l. The dimensions of the multi-dimensional envelope 1308 are adjusted to increase the lateral clearance from the AV 1304 to the one or more objects 1320 or pedestrians 1324.

In one embodiment, the dimensions of the multi-dimensional envelope 1308 are based on information representing physical barriers and road features contained within a map of the environment 1316, information from the sensors 1352 representing distances from and movement of objects external to the AV 1306, or information from the planning module 1328 and control module 1336 representing a vehicular maneuver that the AV 1306 is about to perform or is already performing. In one embodiment, the vehicular maneuver includes a lane change, passing another vehicle, parallel parking, a two-point turn, a left turn, a right turn, navigating a traffic circle, moving over for an emergency vehicle, turning into a parking lot, or merging onto a highway.

In one embodiment, the multi-dimensional envelope 1308 is generated using information contained within a map of the environment 1316 containing the AV 1304. The information contained within the map of the environment 1316 represents a road, a parking lot, a bridge, a construction zone, a curb of a road, a boundary of a lane, an intersection, or a building of the environment. In one embodiment, the generating of the multi-dimensional envelope 1308 includes determining a distance of the AV 1304 from a physical curb, a boundary of a lane in which the AV 1304 is traveling, or an intersection of the lane with another lane. The distance may be determined based on the AV's present spatiotemporal location derived from a GNSS device or an IMU and the information contained within the map of the environment 1316. The distance may also be determined using the sensors 1352. In one embodiment, the sensors 1352 emit an electromagnetic field or a beam of electromagnetic radiation (infrared, for instance), and determine changes in the field or return signal from a physical curb on the street. In one embodiment, the sensors 1352 use a laser beam to determine the distance to the curb, based on the time of flight principle, by sending a laser pulse in a narrow beam towards the curb and measuring the time taken by the pulse to be reflected off the curb and returned to the sensor 1352. The planning module 1328 generates the multi-dimensional envelope 1308 to include the trajectory for the AV 1304 as well as increase lateral clearance from the physical curb, boundary of the lane, or the intersection of the lane with another lane.

In one embodiment, the generating of the multi-dimensional envelope 1308 includes sampling the trajectory to identify a plurality of spatiotemporal locations on the trajectory. The planning module 1328 reduces the continuous trajectory to a sequence of discrete spatiotemporal samples, wherein each sample L is a value or set of values at a point in time and space. For example, the planning module 1328 may perform the sampling of the continuous trajectory 1356 function every T seconds. In another embodiment, the planning module 1328 performs spatiotemporal clustering based on time and distance to identify the plurality of spatiotemporal locations on the trajectory 1356, then extracts the plurality of spatiotemporal locations using identification of density peaks. The planning module 1328 determines a lateral error tolerance $E_L$ with respect to the identified objects 1320 or 1324 for each sampled spatiotemporal location L of the plurality of spatiotemporal locations. The planning module 1328 generates the multi-dimensional envelope 1308 using the determined lateral error tolerance $E_L$ for each spatiotemporal location L of the plurality of spatiotemporal locations.

In one embodiment, the planning module 1328 generates the multi-dimensional envelope 1308 using dynamic information describing the identified objects 1320 and 1324. The perception module 1348 determines a distance of the AV 1304 from the objects 1320 or 1324. The planning module 1328 generates the multi-dimensional envelope 1308 to include the trajectory 1356 for the AV 1304 as well as increase lateral clearance from the objects 1320 or 1324.

In one embodiment, the AV 1304 performs collision checking with respect to moving objects on the road that are on one side the AV 1304. For example, a moving object may be determined to be too close to the trajectory 1356 if a distance from the trajectory 1356 to the moving object is smaller than a half width of the AV 1304. The planning module 1328 instructs the AV 1304 to swerve or halt. In another embodiment, if the moving object is nearly perpendicular (e.g., an angle between 45° and 135°) to the trajectory 1356, the planning module 1328 instructs the AV 1304 to swerve or halt. In another embodiment, if the moving object is a pedestrian 1324, the planning module 1328 instructs the AV 1304 to simply halt.

The planning module 1328 adjusts a dimension of the multi-dimensional envelope 1308 to adjust a lateral clearance between the AV 1304 and the objects 1320 and/or 1324. The adjusting of the dimension of the multi-dimensional envelope 1308 prevents collisions between the AV 1304 and the objects, increases passenger comfort, and increases the AV's speed at by avoiding objects. In one embodiment, the planning module 1328 adjusts a dimension of the multi-dimensional envelope 1308 to improve passenger comfort, as described in more detail below with respect to the sensors 1352. The planning module 1328 receives, from the sensors 1352 of the AV 1304, information 1364 representing passenger data of a passenger in the AV 1304. The information 1364 is described in more detail below with reference to the sensors 1352 and represents a level of comfort the passenger is experiencing. The planning module 1328 adjusts the dimension of the multi-dimensional envelope 1308 to increase the level of passenger comfort using the passenger data 1364.

In one embodiment, the planning module 1328 uses an environmental context of the AV 1304 to determine whether to adjust the dimension of the multi-dimensional envelope 1308. The environmental context of the AV 1304 is determined by the planning module 1328 based on the information 1364 obtained from the sensors 1352. In one embodiment, the context is expressed in terms of a LiDAR point data cloud, images of an object 1320, a present location of the AV 1304, a directional orientation of the AV 1304, a magnitude of acceleration of the AV 1304, or a velocity of the AV 1304. For example, the AV 1304 may determine that a collision between the AV 1304 and the object 1320 is likely to occur. However, the planning module 1328 detects that the road ahead bends away from the object 1320 based on the information 1364 obtained from the sensors 1352. The planning module 1328 will not (or will only minimally) adjust the dimension of the multi-dimensional envelope 1308. In another example, the planning module 1328 detects that the object 1320 is moving away from the AV 1304 based on the information 1364 obtained from the sensors 1352. The planning module 1328 will not (or will only minimally) adjust the dimension of the multi-dimensional envelope 1308.

The control module 1336 is communicatively coupled to the planning module 1328. The control module 1336 receives data representing the multi-dimensional envelope 1308 and a present AV position 418, and operates the AV controls 1340 to cause the AV 1304 to travel along the multi-dimensional envelope 1308. In one embodiment, portions of the control module 1336 are implemented in software or hardware. For example, the control module 1336 or a portion of the control module 1336 may be part of a PC, a tablet PC, an STB, a smartphone, a IoT appliance, or any machine capable of executing instructions that specify actions to be taken by that machine. The control module 1336 is described in more detail above with reference to control module 406 in FIGS. 4 and 11.

In one embodiment, the control module 1336 determines a centerline of the adjusted multi-dimensional envelope 1308. The AV 1304 defines the multi-dimensional envelope 1308 and successively matches the multi-dimensional envelope 1308 against images of the road surface along the orientation of the trajectory 1356. Once a match is found, the AV 1304 shifts a matched target window further along the trajectory 1356. By repeating the process, the AV 1304 obtains a series of points that define the centerline successively. The AV controls 1340 receive the command 1368 from the control module 1336 and adjust the steering, brakes, and throttle of the AV 1304. In one embodiment, portions of the AV controls 1340 are implemented in software or hardware. For example, the AV controls 1340 or a portion of the AV controls 1340 may be part of a PC, a tablet PC, an STB, a smartphone, an IoT appliance, or any machine capable of executing instructions that specify actions to be taken by that machine. The AV controls 1340 are described in more detail above with reference to modules 406 and 420a-c in FIG. 4.

The input device 1344 receives instructions (such as a desired destination or trajectory) from a passenger within the AV 1304. The input device 1344 transmits the instructions 1360 to the planning module 1328. In one embodiment, the input device 1344 translates instructions from a human-readable format or natural language to a computer program, pseudocode, machine-language format, or assembly-level format for the planning module 1328 to use. The input device 1344 may include a touchscreen display or keyboard. The input device 1344 is described in more detail above with reference to the input device 314 and cursor controller 316 in FIG. 3.

The perception module 1348 identifies the objects 1320 or 1324 and transmits information 1372 representing the identified objects to the planning module 1328. In one embodiment, the perception module 1348 includes a camera or a LiDAR to identify the objects 1320 or 1324. In one embodiment, the perception module 1348 receives images or sensor data from the sensors 1352 and performs object recognition on the images or sensor data. In one embodiment, the perception module 1348 uses edge detection (e.g., Canny edge detection) to find edges within the sensor data and then compare the edge images to templates. In one embodiment, the perception module 1348 uses gradient matching to determine an image gradient in the received images or sensor data to identify the objects 1320 and 1324. The information 1372 representing the identified objects is transmitted to the planning module 1328 to determine whether the identified objects lie along or adjacent to the trajectory. The planning module 1328 also determines a likelihood of collision $L_C$ for the AV 1304 with the objects 1320 or 1324. The perception module 1348 is described in more detail above with reference to the perception module 402 in FIG. 4.

The sensors 1352 sense a state of the AV 1304 and its environment 1316 (including the presence of objects 1320 or 1324) and transmit information 1364 representing the state to the planning module 1328 and/or the perception module 1348. In one embodiment, the planning module 1328 adjusts the dimension of the generated multi-dimensional envelope 1308 based on a speed of the AV 1304, an acceleration, or a magnitude of jerk. The magnitude of jerk is a vector representing a rate of change of acceleration of the AV 1304 (a time derivative of acceleration, and as such a second derivative of the AV 1304's velocity, or a third time derivative of the AV 1304's position). The SI units for the magnitude of jerk are $m/s^3$.

In one embodiment, the sensors 1352 include an IMU to measure a vehicle linear acceleration or angular rate, a wheel speed sensor for measuring or estimating a wheel slip ratio, a wheel brake pressure or braking torque sensor, an engine torque or wheel torque sensor, or a steering angle or angular rate sensor, as described in more detail above with reference to FIG. 1. The sensors 1352 measure the magnitude of jerk as a rate of change of acceleration of the AV 1304. The planning module 1328 adjusts the dimension of the generated multi-dimensional envelope 1308 to reduce changes in the speed of the AV 1304, acceleration, and the magnitude of jerk to provide a more comfortable ride to the passengers within the AV 1304. The reduced magnitude of jerk and the larger lateral clearance between the AV 1304 and other objects provides increased passenger comfort because reduced physical movement of the AV 1304 and increased distances to intruding external objects has a positive effect on the perceived comfort of the passengers.

In one embodiment, the planning module 1328 adjusts the dimension of the multi-dimensional envelope 1308 to increase passenger comfort. The sensors 1352 transmit information 1364 representing passenger comfort data of a passenger in the vehicle to the planning module 1328. In one embodiment, the passenger comfort data includes biometric data (e.g., heart rate, pitch of voice, pupil activity, skin response, pressure on arm rest, etc.) of the passenger. In another embodiment, the sensors 1352 include biometric sensors and the passenger comfort data includes at least one of a skin conductance, a pulse, a heart-rate, or a body temperature representing a level of passenger comfort. In another embodiment, the sensors 1352 include imaging sensors and the passenger comfort data includes facial expressions or a magnitude of pupil dilation. In another embodiment, the sensors 1352 include pressure sensors and the passenger comfort data includes a pressure exerted by the at least one passenger on seat arm rests. In another embodiment, the sensors 1352 include at least one of a heart rate monitor, a sphygmomanometer, a pupilometer, an infrared thermometer, or a galvanic skin response sensor. The planning module 1328 adjusts a dimension using the measured passenger comfort data to increase the level of passenger comfort, e.g., such that the passenger's heart rate reduces, pitch of voice reduces, pupil activity reduces, or pressure on arm rest reduces. The sensors are described in more detail above with reference to sensors 121-123 in FIG. 1.

In one embodiment, the planning module 1328 includes a machine learning model that is used for adjusting of the dimensions of the generated multi-dimensional envelope 1308. The machine learning model can be part of the planning module 1328 or another component of the AV 1304. The machine learning model is constructed from training data that contains the inputs (for example, features extracted from the one or more objects 1320 and the threshold distance to the trajectory) and the desired outputs (for example, a particular safe or desired lateral clearance).

The planning module 1328 uses the machine learning model to determine a particular lateral clearance between the multi-dimensional envelope 1308 and the one or more objects 1320. The particular lateral clearance indicates a safe or preferred lateral clearance that the machine learning model has been trained to determine. In some embodiments, the planning module 1328 can extract features from the one or more objects 1320 and the threshold distance to the trajectory. In other embodiments, such as when a convolutional neural network (CNN) is used, the feature extraction is implicitly performed by the CNN together with the model construction. A CNN is a feed-forward artificial neural network in which the connectivity pattern between its neurons is inspired by the organization of a visual cortex. The advantage of a CNN includes the obviation of explicit feature extraction and the use of shared weight in convolutional layers, which means that the same filter (weights bank) is used for each element in the layer; this both reduces memory footprint and improves performance.

In one embodiment, the machine learning model determines the particular lateral clearance between the multi-dimensional envelope 1308 and the one or more objects 1320 based on features extracted from the sensor data 1364, the perception data 1372, and the data 1360. The planning module can extract the features, which are compact, non-redundant representations of input data. For example, the features can represent passenger preferences or passenger comfort data, such as the information 1364 representing passenger comfort data of a passenger in the AV 1304 described above. The features can describe a structure or shape of the AV 1308 or the one or more objects 1320 that the perception module 1348 has identified. A feature can include a spatiotemporal location (coordinates) of the objects 1320, a speed (for example, 25 mph) of the objects 1320, or a directional orientation (North) of the objects 1320.

The planning module 1328 modifies at least one dimension of the multi-dimensional envelope 1308, such that the lateral clearance between the AV 1304 and the one or more objects 1320 is greater than the particular lateral clearance that is determined to be preferred by the passenger or deemed safe by the machine learning model. For example, the width of the multi-dimensional envelope 1308 can be reduced to reduce the steering angle or the multi-dimensional envelope 1308 can be moved laterally to steer away from a hazard.

In one embodiment, the machine learning model is trained to determine the particular lateral clearance between the multi-dimensional envelope 1308 and the one or more objects 1320 based on features extracted from the one or more objects 1320 and the threshold distance to the trajectory. For example, the server 1312 or the planning module 1328 can use gradient boosting to train the machine learning model for regression and classification. Gradient boosting generates a trained model in the form of an ensemble of decision trees. In one embodiment, the decision trees are used (as a predictive model) to derive conclusions about the particular lateral clearance (represented by the leaves of the tree) based on passenger comfort data, vehicular collision data, or traffic data. The vehicular collision data refers to crash statistics, crash speeds, and lateral movement of vehicles in the minutes before a crash. The traffic data refers to historical traffic patterns associated with vehicular collisions.

Example of Generating a Multi-Dimensional Envelope

Figure 14:
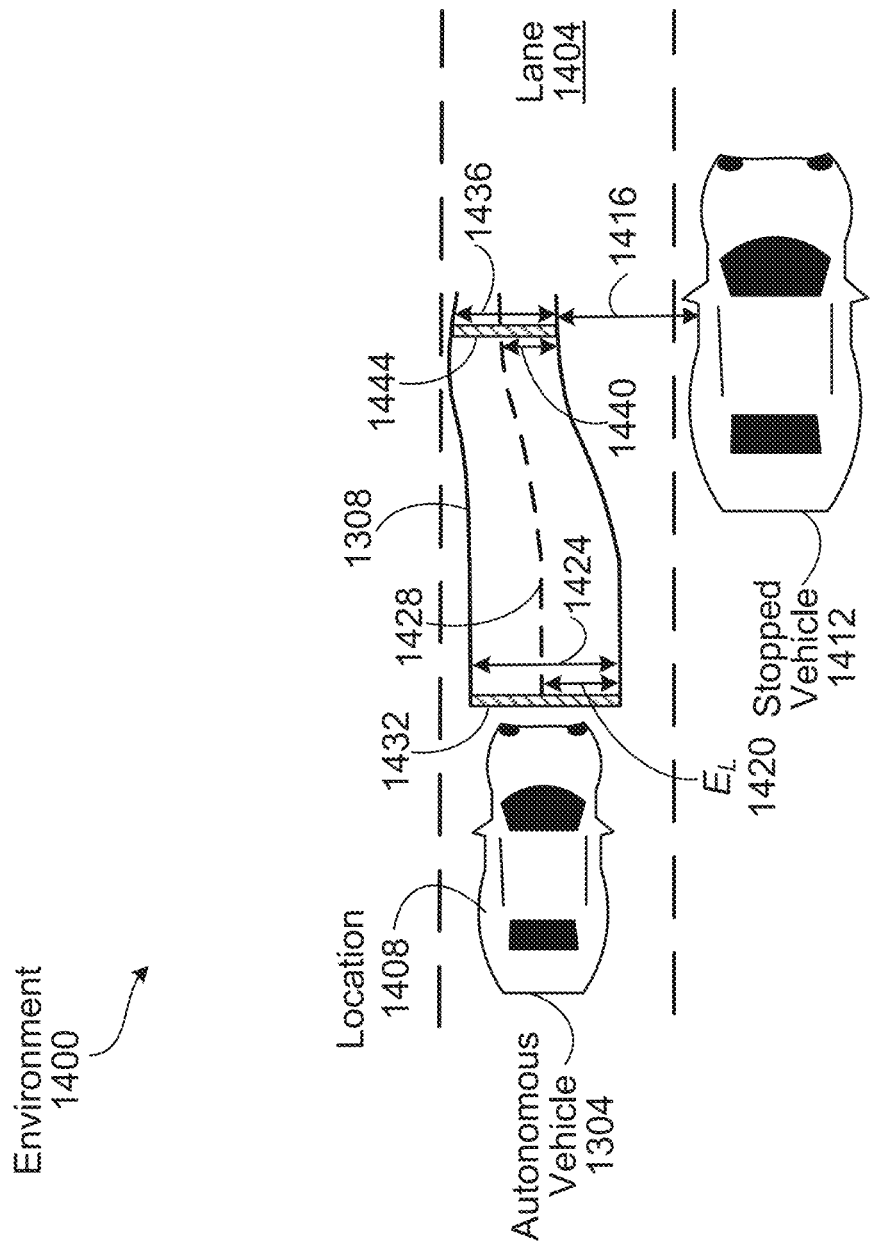
FIG. 14 illustrates an example of generating a multi-dimensional envelope for adjusting lateral clearance, in accordance with one or more embodiments

FIG. 14 illustrates an example of generating the multi-dimensional envelope 1308 for adjusting lateral clearance for the AV 1304, in accordance with one or more embodiments. An environment 1400 illustrated in FIG. 14 includes a lane 1404. The AV 1304 is traveling within the lane 1404 and is initially located at a spatiotemporal location 1408. A stopped vehicle 1412 is located close to a boundary of the lane 1404. In one embodiment, a lane is defined by markings on a road surface. In another embodiment, the "lane" may be defined by the planning module 1328 independent of the road markings. For example, if a vehicle, such as object 1320, is temporarily parked ahead of the AV 1304 and is occupying a portion of the marked lane, the planning module 1328 may define a new "lane" to be the remaining portion of the marked lane and a portion of an adjacent marked lane. Thus, the "lane" is defined to be "any portion" within the drivable surface area of a road segment.

The AV 1304 begins navigation at location 1408. The planning module 1328 generates the multi-dimensional envelope 1308 indicating a drivable region for the AV 1304. To determine a width 1424 of the multi-dimensional envelope 1308, the planning module 1328 determines a lateral error tolerance $E_L$ 1420 with respect to the boundaries of the lane 1404. In one embodiment, the width 1424 of the multi-dimensional envelope 1308 is determined as $N \times E_L$, where N equals 2. The width 1424 of the multi-dimensional envelope 1308 represents a magnitude of lateral freedom of the AV 1304 to steer laterally within the lane 1404 in which the AV 1304 is traveling.

In one embodiment, a control module 1336 navigates the AV 1304 along the multi-dimensional envelope 1308 from location 1408. In another embodiment, the control module 1336 determines a centerline 1428 of the multi-dimensional envelope 1308. The control module 1336 defines the multi-dimensional envelope 1308 and successively matches the multi-dimensional envelope 1308 against images of the road surface along the orientation of the trajectory (e.g., the center of lane 1404). Once a match is found, the control module 1336 shifts a matched target window 1432 further along lane 1404. By repeating the process, the control module 1336 obtains a series of points that define the centerline 1428 successively. The control module 1336 navigates the AV 1304 along the determined centerline 148 of the multi-dimensional envelope 1308 from location 1408.

The AV 1304's sensors (e.g., 1352 illustrated in FIG. 13) detect the stopped vehicle 1412 and adjust the AV 1304's lateral clearance 1416 from the stopped vehicle 1412. The width of the multi-dimensional envelope 1308 is decreased to bend the multi-dimensional envelope 1308 away from the stopped vehicle 1412 to increase the lateral clearance 1416 even though the stopped vehicle 1412 is not protruding within the lane 1404. The lateral clearance 1416 is increased because even though the two vehicles will likely not collide, a larger lateral clearance 1416 provides greater passenger comfort to passengers riding within the AV 1304. Moreover, if the stopped vehicle 1412 were to suddenly enter lane 1404, the larger lateral clearance 1416 would provide more time for the AV 1304 to stop, speed up, or turn away to avoid a potential collision.

To determine the new (smaller) width 1436 of the multi-dimensional envelope 1308, the planning module 1328 determines a lateral error tolerance $E_L$ 1440 with respect to the stopped vehicle 1412. In one embodiment, the width 1436 of the multi-dimensional envelope 1308 is determined as $N \times E_L$, where N equals 2. The AV 1304 defines the multi-dimensional envelope 1308 and successively matches the multi-dimensional envelope 1308 against images of the road surface along the center of the lane 1404. Once a match is found, the AV 1304 shifts the matched target window 1444 further along lane 1404 to continue to navigate the AV 1304 along the determined centerline 1428 of the multi-dimensional envelope 1308.

In one embodiment, the planning module 1328 considers the present state of the stopped vehicle 1412 (perceived via the sensors 1352) and also predicts a potential future behavior of the stopped vehicle 1412 to adjust the width 1436 of the multi-dimensional envelope 1308. The planning module 1328 considers possible changes of traffic surrounding the AV 1304 during a finite time-horizon (e.g., a time period that the AV 1304 will take to reach the next intersection or the next lane change, etc.). The planning module 1328 adjusts the width 1436 of the multi-dimensional envelope 1308 by considering probabilistic predictions of future positions of other vehicles (e.g., the stopped vehicle 1412). In one embodiment, the control module 1336 uses model predictive control (MPC) to generate the commands 1368 to the AV controls 1340 representing changes in steering, acceleration, and velocity to navigate the AV 1304 along the lane 1404.

Example of Adjusting Lateral Clearance Using a Multi-Dimensional Envelope

Figure 15:
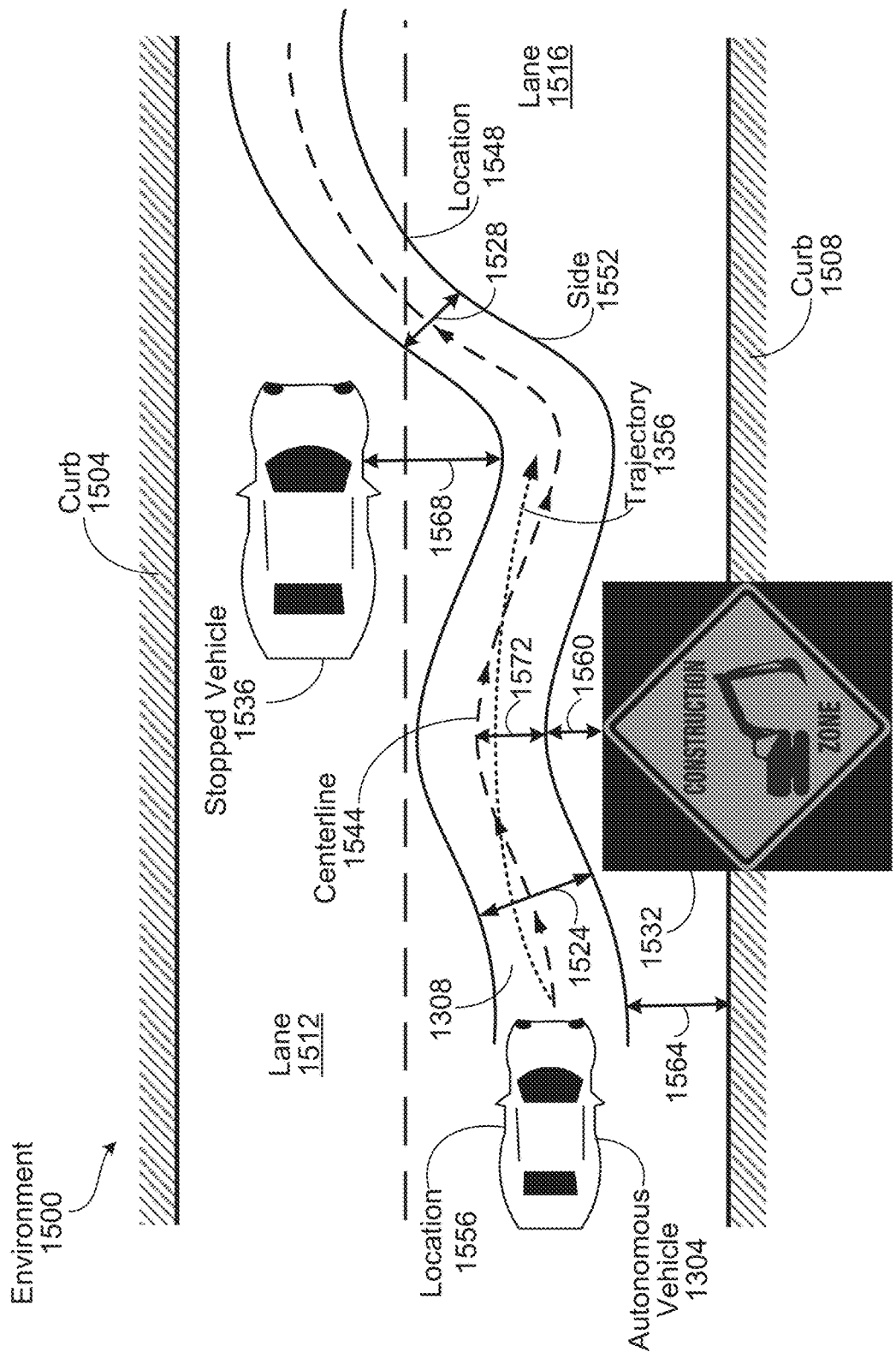
FIG. 15 illustrates an example of adjusting lateral clearance using a multi-dimensional envelope, in accordance with one or more embodiments.

FIG. 15 illustrates an example of adjusting lateral clearance for the AV 1304 using a multi-dimensional envelope (e.g., 1308 in FIG. 13), in accordance with one or more embodiments. An environment 1500 (e.g., road segment) illustrated in FIG. 15 includes two lanes 1516 and 1512. The lane 1516 is bounded by lane 1512 and a curb 1508. The AV 1304 is traveling within the lane 1516 and located at a spatiotemporal location 1556. The boundary between the lanes 1516 and 1512, and the curbs 1504 and 1508 would be present within a map of the environment 1500. The AV 1304 would therefore be able to use information from the map for trajectory planning and adjusting a lateral clearance (e.g., 1564) from those objects. A temporary construction zone 1532 is located partly on the curb 1508 and partly within the lane 1516. Because the construction zone 1532 is temporary, it may or may not be visible on a map of the environment 1500. Therefore, the AV 1304 would use its sensors (e.g., 1352 illustrated in FIG. 13) to detect the construction zone 1532 and determine and adjust a lateral clearance 1560 from the construction zone 1532.

The lane 1512 is bounded by lane 1516 and a curb 1504. A vehicle 1536 is stopped or parked within the lane 1512. Because the vehicle 1536 is a dynamic object, it will likely not be visible on a map of the environment 1500. Therefore, the AV 1304 would use its sensors (e.g., 1352 illustrated in FIG. 13) to detect the vehicle 1536 and determine and adjust a lateral clearance 1568 from the vehicle 1536 using the embodiments disclosed herein.

Turning now to FIG. 15, the AV 1304 begins navigation at location 1556. The planning module (e.g., 1328 in FIG. 13) generates a trajectory for the AV 1304. The trajectory includes a plurality of spatiotemporal locations (e.g., locations 1556 and 1548). To navigate the AV 1304, the planning module 1328 generates a multi-dimensional envelope 1308 indicating a drivable region for the AV 1304. The multi-dimensional envelope 1308 contains the desired trajectory for the AV 1304.

The multi-dimensional envelope 1308 corresponds to a shape having a geometric volume. In one embodiment, the geometric volume is tubular, cubic, or conical. The multi-dimensional envelope 1308 therefore includes a closed volume that completely contains the AV 1304. The multi-dimensional envelope 1308 is used to improve the efficiency of navigation and lateral maneuver operations by testing for overlap with other objects. For example, if the multi-dimensional envelope 1308 and the coordinates of an object do not intersect, a collision would not be predicted.

A perception module 1348 identifies, using one or more sensors, one or more objects, such as vehicle 1536, that lie along or adjacent to the trajectory 1356. The perception module 1348 also determines a likelihood of collision $L_C$ for the AV 1304 with the objects greater than zero. In one embodiment, the generating of the multi-dimensional envelope 1308 includes determining the width 1524 of the multi-dimensional envelope 1308 using a lateral error tolerance $E_L$ (e.g., 1572) with respect to the identified objects (e.g., curb 1508 or construction zone 1532) for at least one side 1552 of the multi-dimensional envelope 1308. In one embodiment, the width 1524 of the multi-dimensional envelope 1308 is determined as $N \times E_L$, where N equals 2. The width 1524 of the multi-dimensional envelope 1308 represents a magnitude of lateral freedom of the AV 1304 to steer laterally within the lane 1516 in which the AV 1304 is traveling. Changes in the AV 1304's steering angle (represented by commands 1362 in FIG. 13) are based on the width 1524 of the multi-dimensional envelope 1308 and provided by the control module 1323 to the AV controls 1340 (described and illustrated above with reference to FIG. 13).

In one embodiment, the planning module 1328 determines a likelihood of collision $L_C$ for the AV 1304 with an identified object, such as vehicle 1536, using a speed constraint for the AV 104. A speed constraint is an operational metric associated with a segment of the trajectory that the AV 104 can drive along. The speed constraint may be determined based on traffic laws and other rules, and also based on the presence or speed of static or dynamic objects in the environment 1316. Examples of speed constraints include a maximum or minimum legal speed limit, a speed of another object such as another moving vehicle that is ahead of the vehicle, a mechanical limitation of the vehicle, a speed limit based on component failure of the vehicle, a speed limit based on a weather condition, a user-preferred speed limit, or a speed limit based on a road feature such as an angle of curvature or gradient. Speed constraints are described in more detail above with reference to speed constraints 912 in FIG. 9. In this embodiment, the sensors 1352 determine the speed of the AV 1304 traveling along the trajectory between a present spatiotemporal location 1556 of the AV 1304 and a spatiotemporal location 1548 on the trajectory where the trajectory intersects a boundary of the lane 1516. At location 1548, the trajectory of AV 1304 changes lanes into lane 1512. The likelihood of collision $L_C$ is determined only between the present spatiotemporal location of the vehicle and the boundary of the lane to reduce the complexity of computation, the amount of data stored, and the time required for computation.

In one embodiment, the planning module 1328 determines the likelihood of collision $L_C$ for the AV 1304 with the vehicle 1536 by predicting a trajectory for the vehicle 1536. In one embodiment, the planning module 1328 predicts that the vehicle 1536 will move in a straight line at its present speed. In one embodiment, the planning module 1328 uses an extended Kalman filter to track the vehicle 1536 and determine a time for a potential collision. In another embodiment, the planning module 1328 uses sensor fusion to combine the data 1364 (e.g., using a Kalman filter) from the sensors 1352. The planning module 1328 determines potential behaviors for the vehicle 1536 (e.g., change of lanes, left turn, etc.) and assigns probabilities to each potential behavior. The determining of the likelihood of collision $L_C$ for the AV 1304 as a function of its trajectory and speed is illustrated and described in more detail below with reference to FIG. 16.

In one embodiment, the planning module 1328 determines a likelihood of collision $L_C$ for the AV 1304 with the identified objects (e.g., vehicle 1536) relative to a location on a longitudinal axis of the AV 1304, wherein the location is situated away from a rear axle of the AV 1304. The longitudinal axis is a tangent to the centerline 1544. The determining of the likelihood of collision $L_C$ for the AV 1304 is illustrated and described in more detail below with reference to FIG. 16.

To increase lateral clearance from objects (e.g., curb 1508 and vehicle 1536) while navigating the AV 1304, the planning module 1328 adjusts at least one dimension (e.g., width 1524) of the multi-dimensional envelope 1308. For example, the AV 1304 maintains a lateral clearance 1564 from curb 1508. The dimensions of the multi-dimensional envelope 1308 are adjusted when the AV 1304 senses the construction zone 1532. The multi-dimensional envelope 1308 bends away from the construction zone 1532 towards the lane boundary separating lanes 1516 and 1512. This achieves a greater lateral clearance 1560 from construction zone 1532 than if the multi-dimensional envelope 1308 were not used. As the AV 1304 approaches the stopped vehicle 1536, the dimensions of the multi-dimensional envelope 1308 are again adjusted to bend the multi-dimensional envelope 1308 away from the stopped vehicle 1536 toward the center of lane 1516. This achieves a larger lateral clearance 1568 from stopped vehicle 1536 than if the multi-dimensional envelope 1308 were not used.

In the embodiment of FIG. 15, after the AV 1304 passes the stopped vehicle 1536, a passenger or a component of the AV 1304 determines that the AV 1304 should change lanes from lane 1516 to lane 1512. Prior to the lane change maneuver at location 1548, the planning module 1328 reduces at least one dimension (e.g., width 1528) of the multi-dimensional envelope 1308 to reduce freedom of maneuvering (e.g., steering or throttle) of the AV 1304 while changing lanes. The reduction in the freedom of maneuvering provides increased safety to the AV 1304 and other vehicles on the road that may be passing or approaching the AV 1304. In one embodiment, the control module 1336 navigates the AV 1304 along the multi-dimensional envelope 1308 from location 1556 to location 1548 and beyond. In another embodiment, the control module 1336 determines a centerline 1544 of the adjusted multi-dimensional envelope 1308. The control module 1336 navigates the AV 1304 along the determined centerline 1544 of the multi-dimensional envelope 1308.

In some embodiments, one or more processors 146 of the AV 1304 are used to generate the multi-dimensional envelope 1308. The multi-dimensional envelope 1308 is a tube representing the tolerance on the lateral error per each sampled point on a trajectory (e.g., trajectory 1356). In some embodiments, the generating of the multi-dimensional envelope 1308 includes generating, using the one or more processors 146, a shape having a geometric volume. The geometric volume may be tubular, cubic, or conical. The multi-dimensional envelope 1308 indicates a drivable region for the AV 1304 based on static map information and dynamic tracked objects (e.g., object 1320). The one or more processors 146 determine a lateral error tolerance $E_L$ with respect to the object 1320 for at least one side of the generated multi-dimensional envelope 1308. The object 1320 is identified using sensor data 1364. The lateral error tolerance $E_L$ is used to adjust at least one dimension of the generated multi-dimensional envelope 1308 to alter a lateral clearance between the AV 1308 and the identified object 1320, responsive to the determined lateral error tolerance $E_L$ being less than a threshold value. For example, the threshold may be 1 foot or 15%. The adjusting of the dimension of the computed multi-dimensional envelope 1308 reduces the probability of collision of the object 1320 with the AV 1304. An object may represent an active vehicle, an inactive vehicle, a pedestrian, a bicyclist and/or a construction zone. A control module 1336 of the AV 1304 navigates the AV 1304 in accordance with the adjusted multi-dimensional envelope 1308 (e.g., to increase lateral clearance).

In some embodiments, the determining of the lateral error tolerance $E_L$ includes determining, for each sampled point of a plurality of sampled points within the drivable region, a distance between the identified object 1320 and the AV 1320. Using the one or more processors 146, the determined plurality of distances is aggregated. In some embodiments, the generating of the multi-dimensional envelope 1308 includes determining, using the lateral error tolerance $E_L$, the width 1424 of the multi-dimensional envelope 1308 to avoid a collision of the AV 1304 with an identified object. In some embodiments, using a speed constraint for the AV 1304, a probability of collision for the AV 1304 with the identified object 1320 is determined. The probability of collision is determined along a trajectory 1356 between a present spatiotemporal location 1556 and a point 1548 on the trajectory 1356 where the trajectory 1356 intersects a boundary of a lane 1516. In some embodiments, the probability of collision is determined relative to a point on a longitudinal axis of the AV 1304.

In some embodiments, the adjusting of the dimension of the generated multi-dimensional envelope 1308 includes altering, using a speed of the AV 1304, a width 1524 of the generated multi-dimensional envelope 1308 to avoid a collision of the AV 1304 with an identified object 1536. In some embodiments, the adjusting of the dimension of the generated multi-dimensional envelope 1308 includes altering, using an acceleration of the AV 1304, the width 1524 of the generated multi-dimensional envelope 1308 to avoid a collision of the AV 1304 with the identified object 1536. In some embodiments, the adjusting of the dimension of the generated multi-dimensional envelope 1308 includes altering, using a magnitude of jerk of the AV 1304, the width 1524 of the generated multi-dimensional envelope 1308 to avoid a collision of the AV 1304 with the identified object 1536. The factors, such as speed, acceleration, and jerk can be weighted with respect to one another.

In some embodiments, the multi-dimensional envelope 1308 is generated using information contained within a map. The information describes at least one of a road, a parking lot, a bridge, or a construction zone. In some embodiments, the adjusting of the dimension of the generated multi-dimensional envelope 1308 includes altering, using a speed of an identified object, the width of the generated multi-dimensional envelope 1308 to avoid a collision of the AV 1304 with the identified object. The identified object comprises another vehicle or a pedestrian. In some embodiments, the adjusting of the dimension of the generated multi-dimensional envelope 1308 includes determining, using the sensor data 1364, a distance of the AV 1308 from an identified object 1320. Using the distance of the AV 1304 from the identified object 1320, a width 1424 of the generated multi-dimensional envelope 1308 is adjusted to avoid a collision of the AV 1304 with the identified object 1320.

In some embodiments, the adjusting of the dimension of the generated multi-dimensional envelope 1308 includes reducing, using the one or more processors 146, a width 1524 of the multi-dimensional envelope 1308 prior to the AV 1304 performing a lane change maneuver. This reducing of the width 1524 is performed because performance of the AV 1304 is tracked during such maneuver. In some embodiments, the adjusting of the dimension of the multi-dimensional envelope 1308 includes receiving sensor data 1364 from one or more sensors 1352. The sensors 1352 are configured to record the time of day, location, weather, facial expressions, skin conductance, pulse and heart-rate, temperature of a passenger's body, pupil dilation, or pressure on AV seat arm rests of the AV 1304. The sensors 1352 are further configured to sense passenger data, such as a heart rate, pitch of voice, pupil activity, skin response, or pressure on arm rest of at least one passenger in the AV 1304. The AV 1304 alters, using the passenger data 364, a width 1524 of the multi-dimensional envelope 1308.

The benefits and advantages of the embodiments disclosed herein are that navigating the AV 1304 along the dynamic multi-dimensional envelope 1308 results in increased passenger and pedestrian safety by preventing collisions between the AV 1304 and other objects, such as the construction zone 1532 and parked vehicle 1536. The shape or size of the multi-dimensional envelope 1308 as well as the AV's position are adjusted dynamically in response to changing traffic conditions and operating parameters. The embodiments result in increased passenger comfort and an increased speed at which the AV 1304 may travel by avoiding objects because the AV 1304 is able to maneuver around obstacles rather than simply coming to a stop. Increased safety for other vehicles on the road network is also achieved.

Further benefits and advantages of the embodiments disclosed herein are that even when an object is not protruding within a lane within which the AV 1304 is navigating, the lateral clearance is increased. The lateral clearance is increased because even though the vehicles will likely not collide, a larger lateral clearance provides greater passenger comfort to passengers riding within the AV 1304. Moreover, if the object were to suddenly enter the lane, the larger lateral clearance would provide more time for the AV 1304 to stop, speed up, or turn away to avoid a potential collision.

Determining the Likelihood of Collision Based on Trajectory and Speed

FIG. 16 illustrates an example of determining a likelihood of collision $L_C$ based on a trajectory and a speed of the AV 1304, in accordance with one or more embodiments. The function $P_E(t)$ (a function of the trajectory) is determined as a set of points representing the AV 1304 at time t. The function $P_O(t)$ is determined as a set of points representing an object at time t. The likelihood of collision $L_C$ based on a trajectory and a speed of the AV 1304 is determined as illustrated in FIG. 16.

Process for Adjusting Lateral Clearance Using a Multi-Dimensional Envelope

Figure 17:
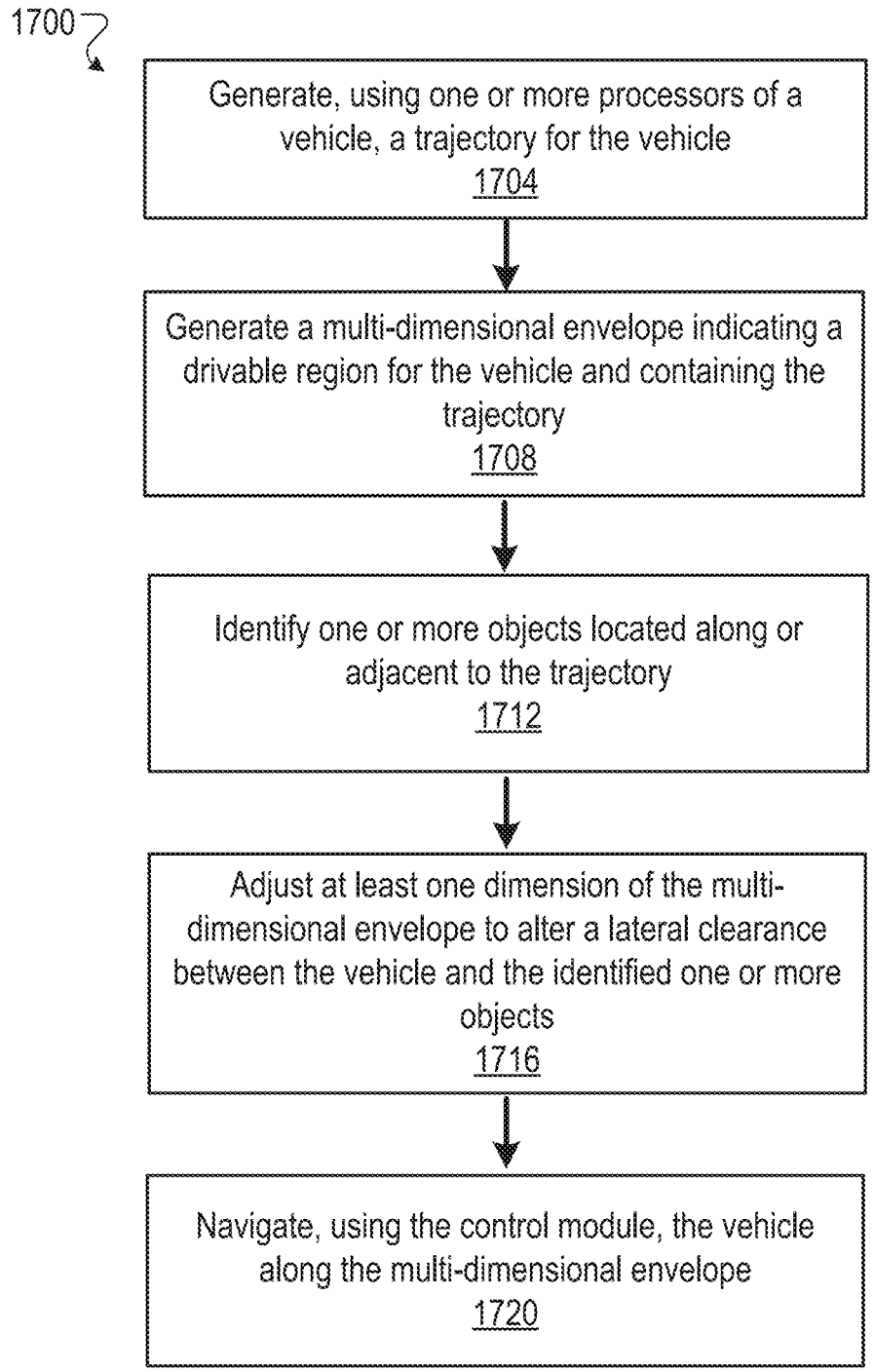
FIG. 17 illustrates a process for adjusting lateral clearance using a multi-dimensional envelope, in accordance with one or more embodiments.

FIG. 17 illustrates a process 1700 for adjusting lateral clearance for the AV 1304 traveling within the lane 1516 using the multi-dimensional envelope 1308, in accordance with one or more embodiments. In one embodiment, the process 1700 of FIG. 17 is performed by one or more components (e.g., the planning module 1328 in FIG. 13) of the AV 1304. Other entities (e.g., a remote server 1312 in FIG. 13) perform some or all of the steps of the process 1700 in other embodiments. Likewise, embodiments include different and/or additional steps, or perform the steps in different orders.

The AV 1304 generates 1704 a trajectory for the AV 1304. The trajectory 1356 includes a plurality of spatiotemporal locations, such as 1556 and 1548 in FIG. 15. In one embodiment, the AV 1304 receives information representing the trajectory 1356 from a server or a passenger in the AV 1304. In one embodiment, the planning module 1328 uses a directed graph representation of the road network to generate the trajectory 1356, as illustrated and described in detail above with reference to FIG. 10.

The AV 1304 generates 1708 the multi-dimensional envelope 1308 indicating a drivable region for the AV 1304 and containing the trajectory 1356. In one embodiment, the multi-dimensional envelope 1308 is generated by determining a distance from one or more objects contained within a map of the environment containing the AV 1304.

The AV 1304 identifies 1712 an object 1532 lying along or adjacent to the trajectory 1356. In one embodiment, the AV 1304 determines a likelihood of collision $L_C$ for the AV 1304 with the object 1532 using a speed constraint for the AV 1304. The sensors 1352 determine the speed of the AV 1304 traveling along the trajectory 1356 between a present spatiotemporal location of the vehicle 1556 and a spatiotemporal location 1548 where the trajectory 1356 intersects a boundary of the lane 1516.

The AV 1304 adjusts 1716 a dimension 1524 of the generated multi-dimensional envelope 1308 to adjust a lateral clearance 1560 between the AV 1304 and the identified construction zone 1532. The adjusting of the at least one dimension 1524 of the multi-dimensional envelope 1308 prevents collisions between the AV 1304 and the construction zone 1532, increases passenger comfort, and increases the speed at which the AV 1304 may travel by avoiding the construction zone 1532 instead of coming to a stop.

The AV 1304 navigates 1720 along the multi-dimensional envelope 1308. In one embodiment, the control module 1336 transmits a command 1368 to the AV controls 1340 to operate the steering, brakes, and throttle of the AV 1304 to navigate the AV 1304.

Process for Adjusting Lateral Clearance Using a Multi-Dimensional Envelope

Figure 18:
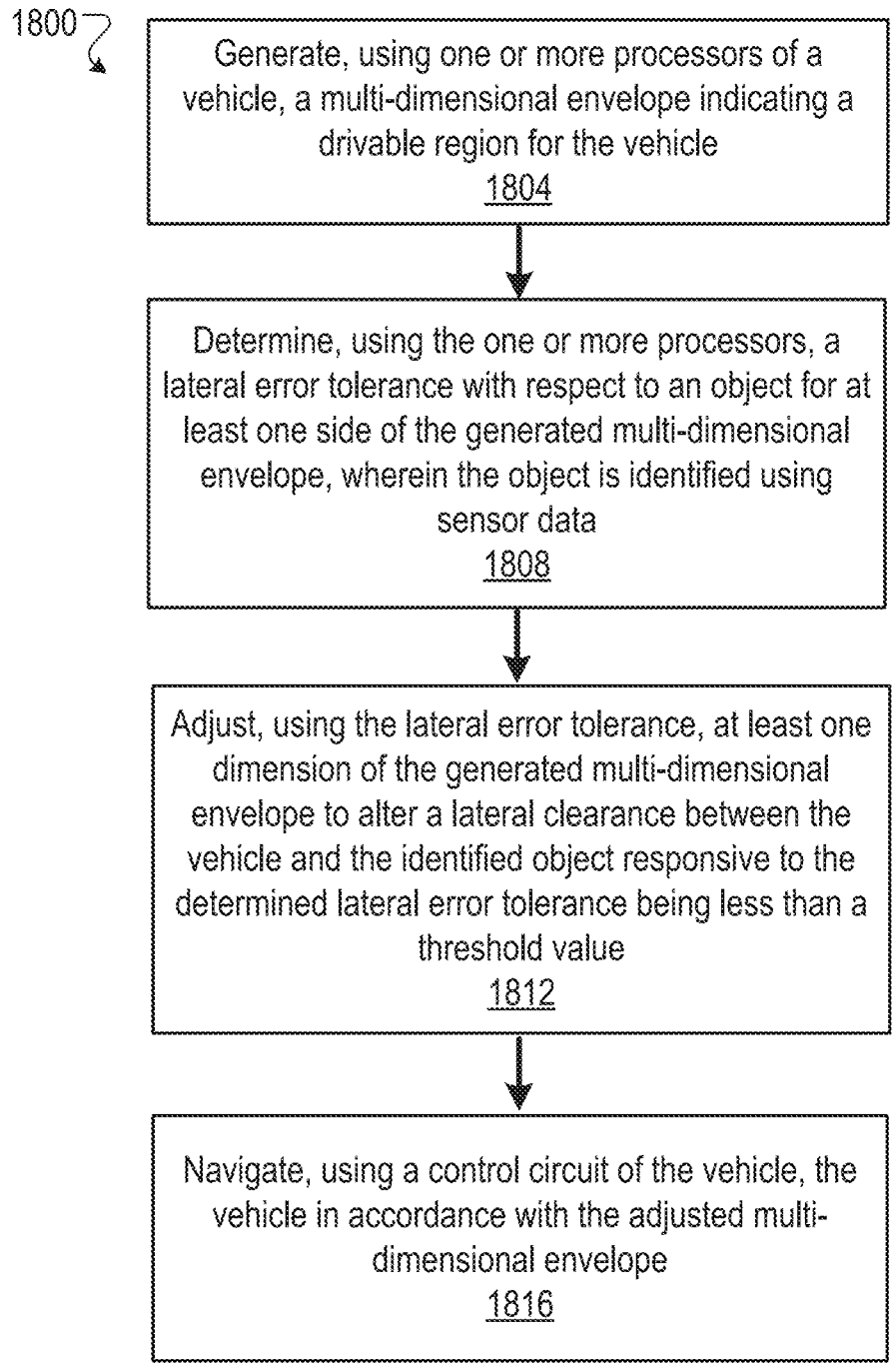
FIG. 18 illustrates a process for adjusting lateral clearance using a multi-dimensional envelope, in accordance with one or more embodiments.

FIG. 18 illustrates a process 1800 for adjusting lateral clearance for the AV 1304 using the multi-dimensional envelope 1308, in accordance with one or more embodiments. In one embodiment, the process 1800 of FIG. 18 is performed by one or more components (e.g., the planning module 1328 in FIG. 13) of the AV 1304. Other entities (e.g., a remote server 1312 in FIG. 13) perform some or all of the steps of the process 1800 in other embodiments. Likewise, embodiments include different and/or additional steps, or perform the steps in different orders.

The AV 1304 generates 1804, using one or more processors 146, a multi-dimensional envelope 1308 indicating a drivable region for the AV 1304. In one embodiment, the multi-dimensional envelope 1308 is generated by determining a distance from one or more objects contained within a map of the environment containing the AV 1304.

The AV 1304 determines 1808, using the one or more processors 146, a lateral error tolerance $E_L$ with respect to an object (e.g., 1320) for at least one side of the generated multi-dimensional envelope 1308. The object 1320 is identified using sensor data 1364. For example, the planning module 1328 may determine the lateral error tolerance $E_L$ with respect to boundaries of a lane. In one embodiment, the width of the multi-dimensional envelope 1308 is determined as $N \times E_L$, where N equals 2.

The AV 1304 adjusts 1812, using the lateral error tolerance $E_L$, at least one dimension of the generated multi-dimensional envelope 1308 to alter a lateral clearance between the AV 1304 and the identified object 1320, responsive to the determined lateral error tolerance $E_L$ being less than a threshold value. For example, the sensors 1352 of the AV 1304 may detect a stopped vehicle and adjust a lateral clearance of the AV 1304 from the stopped vehicle. The width of the multi-dimensional envelope 1308 is decreased to bend the multi-dimensional envelope 1308 away from the stopped vehicle to increase the lateral clearance.

The AV 1304 navigates 1816, using a control module 1336, in accordance with the adjusted multi-dimensional envelope 1308. The control module 1336 receives data representing the adjusted multi-dimensional envelope 1308 and data representing the AV 1304 position and operates the control functions 420a-c (e.g., steering, throttling, braking, ignition) of the AV 1304 in a manner that will cause the AV 1304 to travel a trajectory to a destination.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    generating, using one or more processors, a trajectory for a vehicle, the trajectory comprising a plurality of spatiotemporal locations;
    generating, using the one or more processors, a multi-dimensional envelope indicating first lateral constraints on a drivable region for the vehicle and containing the trajectory;
    identifying, using the one or more processors, one or more objects located within a threshold distance to the trajectory;
    adjusting, using the one or more processors, at least one dimension of the generated multi-dimensional envelope by a machine learning model trained to modify a lateral clearance between the vehicle and the one or more objects and increase passenger comfort, wherein features extracted from the one or more objects and the threshold distance to the trajectory are input to the machine learning model and the machine learning model outputs the lateral clearance, said lateral clearance positively impacting measured passenger comfort data captured by sensors of the vehicle; and
    navigating, using the one or more processors, the vehicle based on the adjusted, generated multi-dimensional envelope.

2. The method of claim 1, wherein the identifying of the one or more objects comprises determining that the vehicle has a likelihood of collision greater than zero with the one or more objects.

3. The method of claim 1, wherein the adjusting of the at least one dimension of the generated multi-dimensional envelope is based on at least one of a speed of the vehicle, an acceleration, or a magnitude of jerk.

4. The method of claim 1, wherein the generated multi-dimensional envelope corresponds to a shape having a geometric volume.

5. The method of claim 4, wherein the geometric volume is tubular, cubic, or conical.

6. The method of claim 1, wherein the generated multi-dimensional envelope is generated based on information contained within a map of an environment in which the vehicle is navigating.

7. The method of claim 6, wherein the information contained within the map of the environment represents at least one of a road, a parking lot, a bridge, a construction zone, a curb of a road, a boundary of a lane, an intersection, or a building.

8. The method of claim 1, wherein the one or more objects are identified from data captured by one or more sensors comprising at least one of a monocular video camera, a stereo video camera, a visible light camera, an infrared camera, a thermal imager, a LiDAR, a radar, an ultrasonic sensor, or a time-of-flight (TOF) depth sensor.

9. The method of claim 1, wherein the identified one or more objects comprise at least one of other vehicles, pedestrians, or cyclists.

10. The method of claim 1, wherein the identified one or more objects comprise construction zones or curbs.

11. The method of claim 1, wherein the adjusting of the at least one dimension of the generated multi-dimensional envelope comprises:
    determining a particular lateral clearance between the vehicle and the one or more objects based on features extracted from the one or more objects and the threshold distance to the trajectory; and
    modifying the at least one dimension of the generated multi-dimensional envelope, such that the lateral clearance between the vehicle and the identified one or more objects is greater than the particular lateral clearance.

12. The method of claim 1, further comprising training the machine learning model to determine a particular lateral clearance between the generated multi-dimensional envelope and the one or more objects based on features extracted from the one or more objects and the threshold distance to the trajectory.

13. The method of claim 1, wherein the machine learning model is based on vehicular collision data or traffic data.

14. The method of claim 1, wherein the generating of the multi-dimensional envelope comprises:
sampling, using the one or more processors, the trajectory to identify the plurality of spatiotemporal locations;
for each spatiotemporal location of the plurality of spatiotemporal locations, determining, using the one or more processors, a lateral error tolerance with respect to the identified one or more objects, the generated multi-dimensional envelope based on the determined lateral error tolerance.

15. The method of claim 1, wherein the generating of the multi-dimensional envelope comprises determining, using the one or more processors, a width of the generated multi-dimensional envelope using a lateral error tolerance with respect to the identified one or more objects for at least one side of the multi-dimensional envelope.

16. The method of claim 1, further comprising determining, using the one or more processors, a likelihood of collision for the vehicle with the identified one or more objects based on a speed constraint for the vehicle, when the vehicle is traveling along the trajectory between a present spatiotemporal location of the vehicle and a spatiotemporal location on the trajectory where the trajectory intersects a boundary of a lane, wherein the vehicle is traveling within the lane and the likelihood of collision is determined for positions between the present spatiotemporal location and the boundary of the lane.

17. The method of claim 1, further comprising determining, using the one or more processors, a likelihood of collision for the vehicle with the identified one or more objects relative to a location on a longitudinal axis of the vehicle.

18. The method of claim 1, wherein the at least one dimension of the generated multi-dimensional envelope is dynamically adjusted responsive to changing traffic conditions and operating parameters.

19. A vehicle comprising:
one or more computer processors; and
one or more non-transitory computer-readable storage media storing instructions which, when executed by the one or more computer processors, cause the one or more computer processors to:
generate a trajectory for the vehicle, the trajectory comprising a plurality of spatiotemporal locations;
generate a multi-dimensional envelope indicating a drivable region for the vehicle and containing the trajectory;
identify, using one or more sensors of the vehicle, one or more objects located within a threshold distance to the trajectory;
adjust at least one dimension of the generated multi-dimensional envelope by a machine learning model trained to modify a lateral clearance between the vehicle and the one or more objects and increase passenger comfort, wherein features extracted from the one or more objects and the threshold distance to the trajectory are input to the machine learning model and the machine learning model outputs the lateral clearance, said lateral clearance positively impacting measured passenger comfort data captured by sensors of the vehicle; and
navigate the vehicle based on the adjusted, generated multi-dimensional envelope.

20. One or more non-transitory computer-readable storage media storing instructions which, when executed by one or more computing devices, cause the one or more computing devices to:
generate a trajectory for a vehicle, the trajectory comprising a plurality of spatiotemporal locations;
generate a multi-dimensional envelope indicating first lateral constraints on a drivable region for the vehicle and containing the trajectory;
identify one or more objects located within a threshold distance to the trajectory;
adjust at least one dimension of the generated multi-dimensional envelope by a machine learning model trained to modify a lateral clearance between the vehicle and the one or more objects and increase passenger comfort, wherein features extracted from the one or more objects and the threshold distance to the trajectory are input to the machine learning model and the machine learning model outputs the lateral clearance, said lateral clearance positively impacting measured passenger comfort data captured by sensors of the vehicle; and
navigate the vehicle based on the adjusted, generated multi-dimensional envelope.

* * * * *